US012682308B2

(12) United States Patent
Tanaka et al.

(10) Patent No.: US 12,682,308 B2
(45) Date of Patent: Jul. 14, 2026

(54) MANAGEMENT DEVICE, MANAGEMENT METHOD, AND RECORDING MEDIUM

(71) Applicant: NEC Corporation, Tokyo (JP)

(72) Inventors: Remi Tanaka, Tokyo (JP); Takeshi Shouta, Tokyo (JP); Hiroyuki Kakinuma, Tokyo (JP); Tomoyuki Muto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 66 days.

(21) Appl. No.: 18/705,008

(22) PCT Filed: Dec. 8, 2021

(86) PCT No.: PCT/JP2021/045037
§ 371 (c)(1),
(2) Date: Apr. 26, 2024

(87) PCT Pub. No.: WO2023/105659
PCT Pub. Date: Jun. 15, 2023

(65) Prior Publication Data
US 2024/0419189 A1      Dec. 19, 2024

(51) Int. Cl.
G06Q 10/083          (2024.01)
G05D 1/247           (2024.01)
(Continued)

(52) U.S. Cl.
CPC ........... G06Q 10/083 (2013.01); G05D 1/247 (2024.01); G05D 1/646 (2024.01); G05D 1/667 (2024.01); G05D 2109/20 (2024.01)

(58) Field of Classification Search
CPC ...... G06Q 10/083; G05D 1/667; G05D 1/247; G05D 1/646; G05D 2109/20
(Continued)

(56) References Cited

U.S. PATENT DOCUMENTS

| | | | |
|---|---|---|---|
| 11,995,599 B1* | 5/2024 | Baalke ................. | G05D 1/0246 |
| 2020/0025575 A1* | 1/2020 | Weissman ........... | G05D 1/0257 |
| 2023/0116869 A1* | 4/2023 | Zhou ................... | G05D 1/0212 |
| | | | 701/25 |

FOREIGN PATENT DOCUMENTS

| | | |
|---|---|---|
| JP | 2005-250691 A | 9/2005 |
| JP | 2010-033850 A | 2/2010 |

(Continued)

OTHER PUBLICATIONS

International Search Report for PCT Application No. PCT/JP2021/045037, mailed on Feb. 1, 2022.

(Continued)

*Primary Examiner* — Mahmoud S Ismail
(74) *Attorney, Agent, or Firm* — Sughrue Mion, PLLC

(57) ABSTRACT

A management device that includes a reception unit that receives transport information relevant to an application for use of an aerial transport path formed indoors, a determination unit that determines whether the aerial transport path can be formed in accordance with the transport information, a reception information output unit that outputs, to a requesting party of the transport information, reception information including a determination result regarding whether the aerial transport path can be formed, a transport path formation unit that generates formation information of the aerial transport path in response to the determination result indicating that the aerial transport path can be formed, and a formation information output unit that outputs the formation information of the aerial transport path to a guide light installed indoors to form the aerial transport path.

20 Claims, 30 Drawing Sheets

(51) Int. Cl.
  *G05D 1/646* (2024.01)
  *G05D 1/667* (2024.01)
  *G05D 109/20* (2024.01)
(58) Field of Classification Search
  USPC ........................................................ 701/431
  See application file for complete search history.

(56) References Cited

FOREIGN PATENT DOCUMENTS

| | | | |
|---|---|---|---|
| JP | 2019-031164 | A | 2/2019 |
| JP | 2019-089461 | A | 6/2019 |
| JP | 2021-163547 | A | 10/2021 |

OTHER PUBLICATIONS

English translation of Written opinion for PCT Application No. PCT/JP2021/045037, mailed on Feb. 1, 2022.

* cited by examiner

Figure 2:
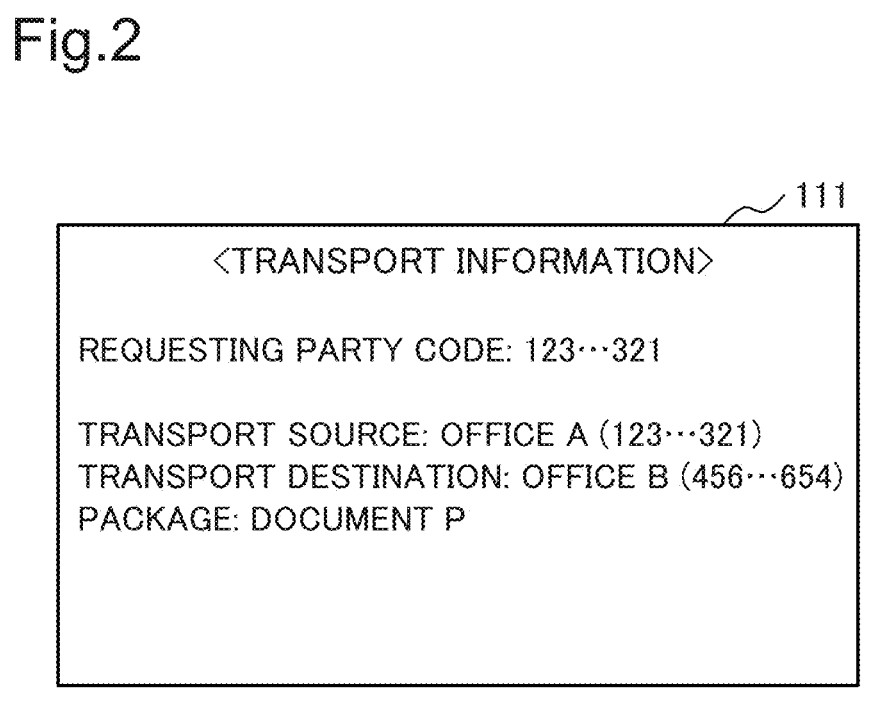

<TRANSPORT INFORMATION>

REQUESTING PARTY CODE: 123···321

TRANSPORT SOURCE: OFFICE A (123···321)
TRANSPORT DESTINATION: OFFICE B (456···654)
PACKAGE: DOCUMENT P

Figure 5:
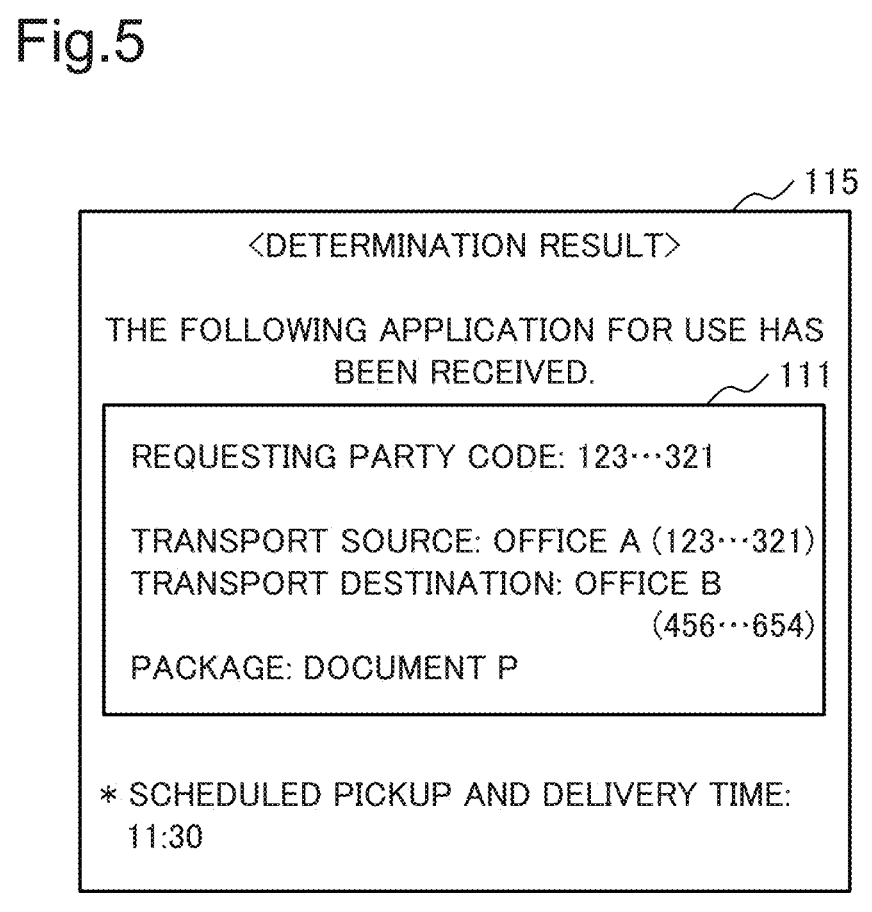

<DETERMINATION RESULT>

THE FOLLOWING APPLICATION FOR USE HAS
BEEN RECEIVED. _/ 111

REQUESTING PARTY CODE: 123···321

TRANSPORT SOURCE: OFFICE A (123···321)
TRANSPORT DESTINATION: OFFICE B
(456···654)

PACKAGE: DOCUMENT P

* SCHEDULED PICKUP AND DELIVERY TIME:
11:30

Figure 21:
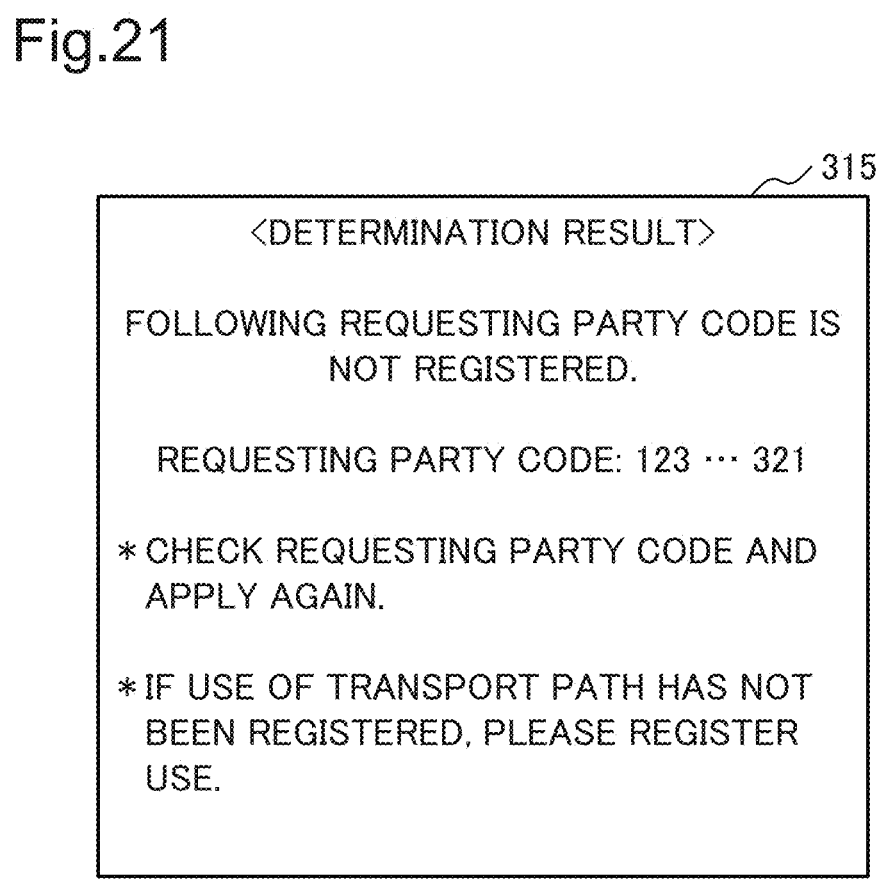

<DETERMINATION RESULT>

FOLLOWING REQUESTING PARTY CODE IS
NOT REGISTERED.

REQUESTING PARTY CODE: 123 ··· 321

＊CHECK REQUESTING PARTY CODE AND
APPLY AGAIN.

＊IF USE OF TRANSPORT PATH HAS NOT
BEEN REGISTERED, PLEASE REGISTER
USE.

Figure 25:
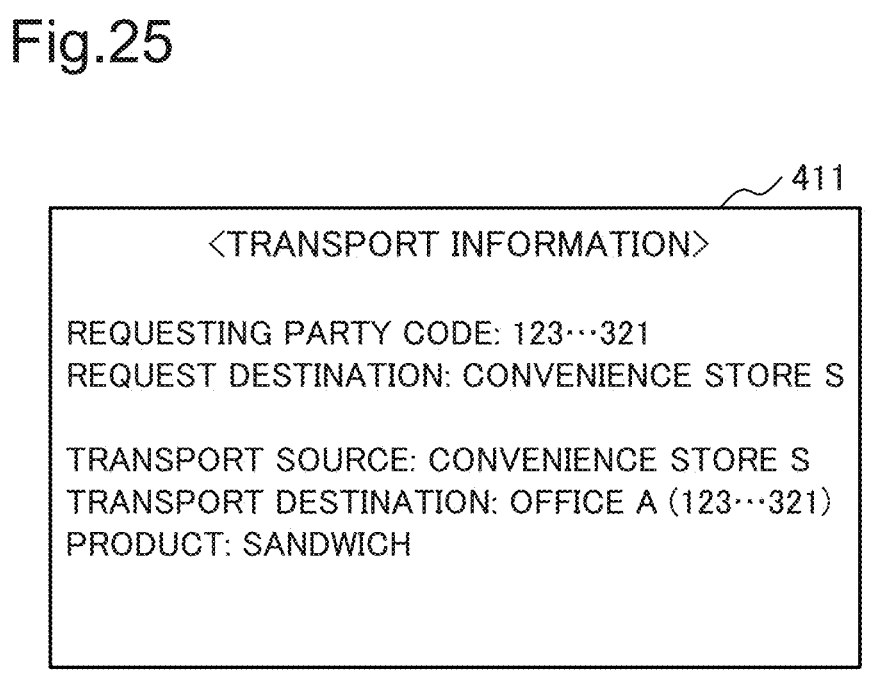

<TRANSPORT INFORMATION>

REQUESTING PARTY CODE: 123···321
REQUEST DESTINATION: CONVENIENCE STORE S

TRANSPORT SOURCE: CONVENIENCE STORE S
TRANSPORT DESTINATION: OFFICE A (123···321)
PRODUCT: SANDWICH

Figure 26:
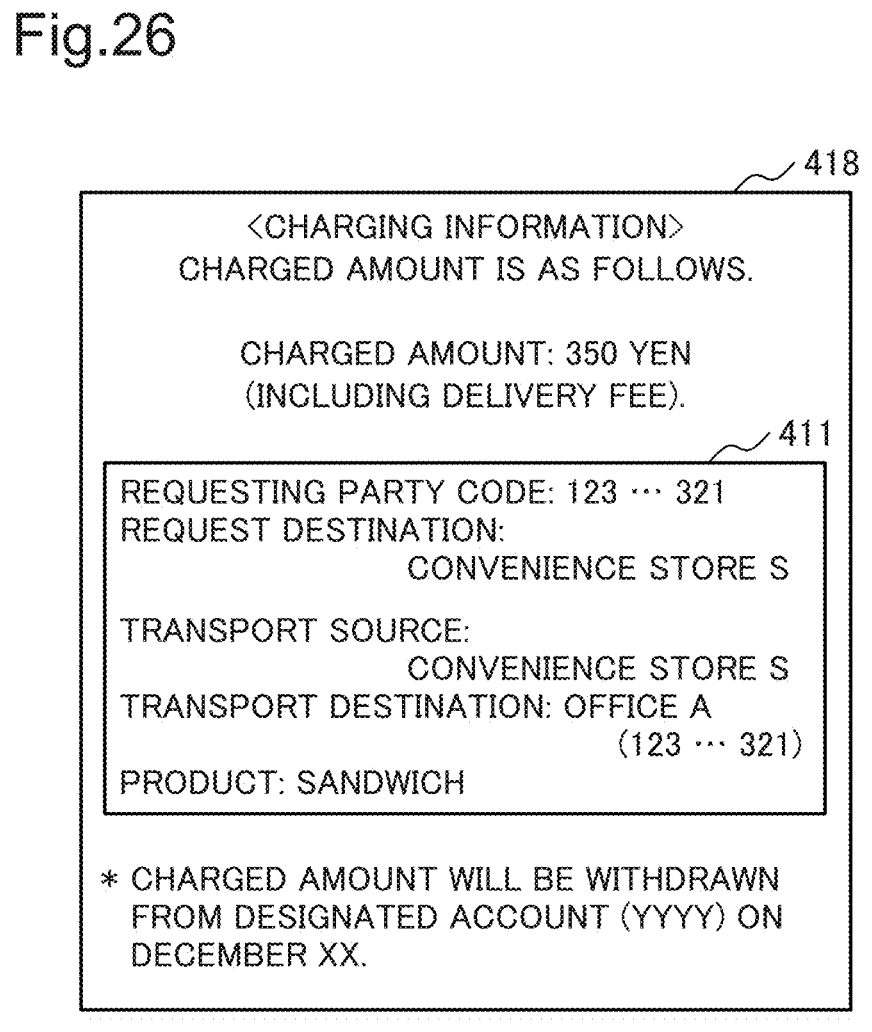

<CHARGING INFORMATION>
CHARGED AMOUNT IS AS FOLLOWS.

CHARGED AMOUNT: 350 YEN
(INCLUDING DELIVERY FEE).

411

REQUESTING PARTY CODE: 123 ⋯ 321
REQUEST DESTINATION:
                        CONVENIENCE STORE S

TRANSPORT SOURCE:
                        CONVENIENCE STORE S
TRANSPORT DESTINATION: OFFICE A
                                (123 ⋯ 321)
PRODUCT: SANDWICH

* CHARGED AMOUNT WILL BE WITHDRAWN
  FROM DESIGNATED ACCOUNT (YYYY) ON
  DECEMBER XX.

Fig.30

MANAGEMENT DEVICE, MANAGEMENT METHOD, AND RECORDING MEDIUM

This application is a National Stage Entry of PCT/JP2021/045037 filed on Dec. 8, 2021, the contents of all of which are incorporated herein by reference, in their entirety.

TECHNICAL FIELD

The present disclosure relates to a management device or the like that manages an aerial transport path.

BACKGROUND ART

There is an increasing need to operate drones in densely populated areas such as urban areas. In order to ensure safe and stable operation of drones, maintenance of airspaces in which drones fly exclusively has been studied. If such maintenance of airspaces are improved, it is possible to carry a package using the airspace dedicated to the drones. For example, if an aerial transport path on which a drone can be used can be formed inside a large building such as an office building, a shopping mall, a warehouse, or an airport, convenience is expected to be improved.

PTL 1 discloses a drone port system for logistics using a drone. The system of PTL 1 includes a drone port arranged in an appropriate position of a flight route for a drone to be parked, and a charging device installed in the drone port. In the system of PTL 1, delivery supplies are carried in the air by a drone from a distribution center to a drone port.

CITATION LIST

Patent Literature

PTL 1: JP 2019-089461 A

SUMMARY OF INVENTION

Technical Problem

According to the method of PTL 1, the delivery supplies can be carried in the air by the drone from the distribution center to the drone port. However, in the method of PTL 1, it is necessary for a delivery person or a recipient to carry a package between the drone port and the transport destination. In the method of PTL 1, an aerial transport path cannot be formed indoors.

An object of the present disclosure is to provide a management device and the like capable of forming an aerial transport path used by a drone to transport a package indoors.

Solution to Problem

A management device according to an aspect of the present disclosure includes a reception unit that receives transport information relevant to an application for use of an aerial transport path formed indoors, a determination unit that determines whether the aerial transport path can be formed in accordance with the transport information, a reception information output unit that outputs, to a requesting party of the transport information, reception information including a determination result regarding whether the aerial transport path can be formed, a transport path formation unit that generates formation information of the aerial transport path in response to the determination result indicating that the aerial transport path can be formed, and a formation information output unit that outputs the formation information of the aerial transport path to a guide light installed indoors to form the aerial transport path.

A management method according to the present disclosure includes receiving transport information relevant to an application for use of an aerial transport path formed indoors, determining whether the aerial transport path can be formed in accordance with the transport information, outputting, to a requesting party of the transport information, reception information including a determination result regarding whether the aerial transport path can be formed, generating formation information of the aerial transport path in response to the determination result indicating that the aerial transport path can be formed, and outputting the formation information of the aerial transport path to a guide light installed indoors to form the aerial transport path.

A program according to an aspect of the present disclosure causes a computer to execute receiving transport information relevant to an application for use of an aerial transport path formed indoors, determining whether the aerial transport path can be formed in accordance with the transport information, outputting, to a requesting party of the transport information, reception information including a determination result regarding whether the aerial transport path can be formed, generating formation information of the aerial transport path in response to the determination result indicating that the aerial transport path can be formed, and outputting the formation information of the aerial transport path to a guide light installed indoors to form the aerial transport path.

Advantageous Effects of Invention

According to the present disclosure, it is possible to provide a management device or the like capable of forming an aerial transport path used by a drone to transport a package indoors.

BRIEF DESCRIPTION OF DRAWINGS

FIG. 2 is an example of transport information input to the management device according to the first example embodiment.

FIG. 5 is an example of reception information including a determination result relevant to transport information input to the management device according to the first example embodiment.

FIG. 12 is a conceptual diagram illustrating an example in which a drone moves on a transport path to be managed by the management device according to the first example embodiment.

FIG. 17 is a conceptual diagram illustrating an example in which a package is mounted on a drone that uses a transport path to be managed by the management device according to the second example embodiment.

FIG. 21 is an example of reception information including a determination result according to an authentication result of a requesting party code included in transport information input to the management device according to the third example embodiment.

FIG. 25 is an example of transport information input to the management device in Application Example 1 of the fourth example embodiment.

FIG. 26 is an example of charging information output from the management device in Application Example 1 of the fourth example embodiment.

FIG. 30 is a block diagram illustrating an example of a hardware configuration that executes control and processing according to each example embodiment.

EXAMPLE EMBODIMENT

Figure 1:
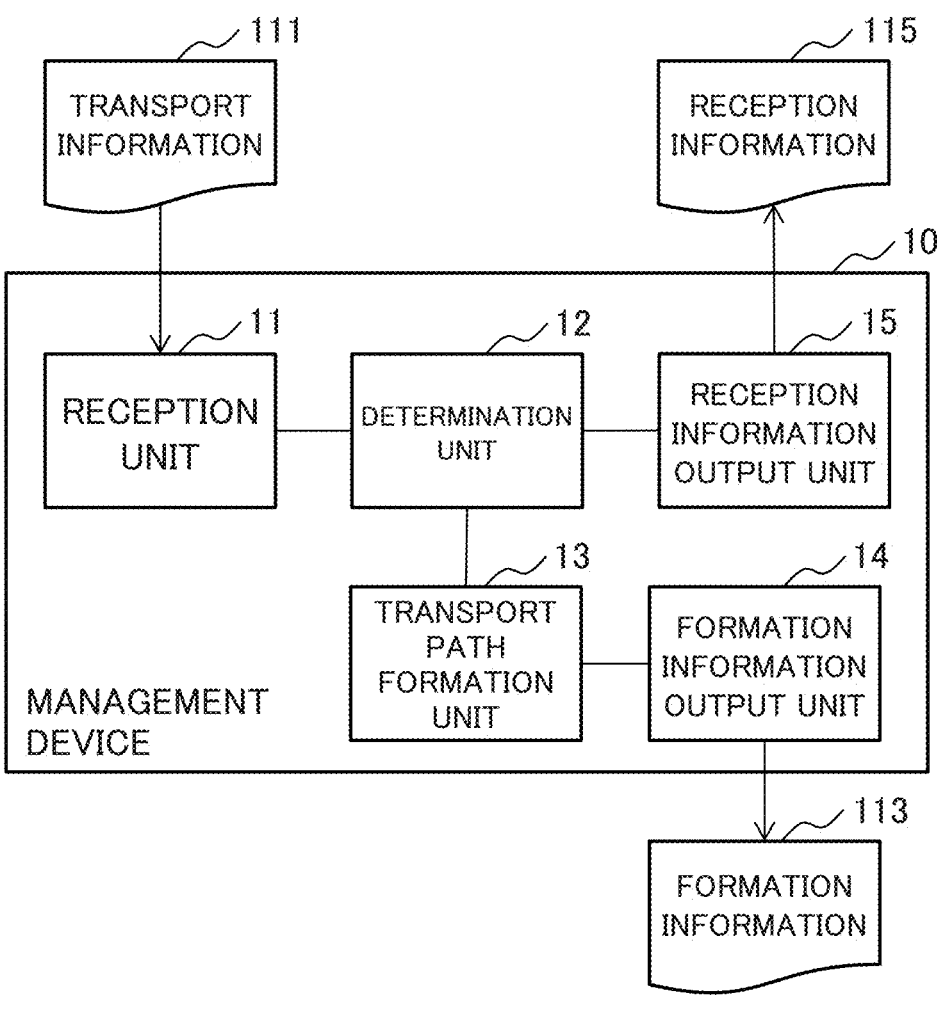
FIG. 1 is a block diagram illustrating an example of a configuration of a management device according to a first example embodiment.

Hereinafter, example embodiments of the present invention will be described with reference to the drawings. However, the example embodiments described below may be technically limited for carrying out the present invention, but the scope of the invention is not limited to the following. In all the drawings used in the following description of the example embodiment, the same reference numerals are given to the same parts unless there is a particular reason. In the following example embodiments, repeated description of similar configurations and operations may be omitted.

First Example Embodiment

First, a management device according to a first example embodiment will be described with reference to the drawings. The management device of the present example embodiment forms an aerial transport path (hereinafter, also referred to as a transport path) used by a drone to transport a package indoors. The drone autonomously navigates in a transport path formed by the management device (also referred to as autonomous navigation). The drone may be configured to navigate the transport path in accordance with control from the management device. In the present example embodiment, an example in which a transport path is formed inside an office building will be described.

Hereinafter, an example in which a flying drone flies on a transport path formed indoors will be described. As long as the drone can navigate, the formation area of the transport path is not particularly limited. The drone is not limited to the flying type, and may be one that travels on the ground or one that navigates on a water surface or under water. The drone is not limited to an unmanned aerial vehicle, and may be a flying vehicle on which a person can board. The transport path may be formed not only indoors but also outdoors.

(Configuration)

FIG. 1 is a block diagram illustrating an example of a configuration of a management device 10 according to the present example embodiment. The management device 10 includes a reception unit 11, a determination unit 12, a transport path formation unit 13, a formation information output unit 14, and a reception information output unit 15.

The reception unit 11 receives transport information 111 relevant to an application for use of the transport path formed indoors. The transport information 111 is input via a terminal device (not illustrated). For example, the transport information 111 is input by a user who wishes to transport a package. For example, the transport information 111 may be input by an operator such as a person in charge of transporting the package. The reception unit 11 outputs the received transport information 111 to the determination unit 12.

FIG. 2 is an example of the transport information 111 received by the management device 10. The transport information 111 in FIG. 2 is an application for using a transport path to transport a document P from a requesting party in an office A to a recipient in an office B. The transport information 111 of FIG. 2 includes a requesting party code, a transport source, a transport destination, and a package. The requesting party code (also referred to as a user code) is a user identifier (ID) of the requesting party, and an identification symbol capable of identifying an individual, such as a registration number, an employee number, and a name. In the case of the example of FIG. 2, the identification symbol "123 . . . 321" of the requesting party is written in the requesting party code. The transport source is a departure point of the package to be transported. In the case of the example of FIG. 2, the place where the requesting party of the identification symbol "123 . . . 321" in the office A is located is the transport source. The transport destination is a destination to which the package is transported. In the case of the example of FIG. 2, a place where the recipient of the identification symbol "456 . . . 654" in the office B is located is the transport destination. The package is a package to be transported. In the example of FIG. 2, the document P is a package. The transport information may include supplementary information other than the requesting party code, the transport source, the transport destination, and the package. For example, the transport information may include supplementary information regarding a transport path desired to be used, a desired formation time of the transport path, and a package to be transported. For example, the supplementary information of the package includes the weight and size of the package. For example, the supplementary information of the package may include information regarding how to handle the package indicating that the package is fragile or is a dangerous article or a valuable article. The supplementary information included in the transport information is not limited. For example, the supplementary information is input by an operator such as a user who wishes the transporting of a package or a person in charge of transporting a package.

The determination unit 12 acquires the transport information 111 from the reception unit 11. The determination unit 12 determines whether the transport path can be formed according to the transport information 111. For example, in a case where it is possible/impossible to form the transport path from the transport source to the transport destination, the determination unit 12 determines that it is possible/impossible to form the transport path. For example, in a case where it is possible/impossible to transport the package to be transported, the determination unit 12 determines that it is possible/impossible to form the transport path. When the transport path can be formed, the determination unit 12 outputs a formation instruction of the transport path to the transport path formation unit 13. The formation instruction of the transport path includes a start point and an end point of the transport path. In the example of FIG. 2, the transport source is relevant to the start point, and the transport destination is relevant to the end point. When the transport path cannot be formed, the determination unit 12 does not output the formation instruction of the transport path to the transport path formation unit 13. In any case where it is possible/impossible to form the transport path, the determination unit 12 outputs reception information 115 including the determination result of whether the transport path can be formed to the reception information output unit 15.

The determination unit 12 may determine whether the transport path can be formed according to the supplementary information included in the transport information. For example, in a case where the transport path desired to be used is included in the supplementary information, the determination unit 12 determines whether the transport path can be formed according to the use situation of the transport path. When the transport path desired to be used is vacant, the determination unit 12 determines that the transport path can be formed. On the other hand, when there is no vacant transport path desired to be used, the determination unit 12 determines that the transport path cannot be formed. In a case where there is no vacant transport path desired to be used, the determination unit 12 may recommend use of an alternative transport path.

For example, in a case where the desired formation time of the transport path is included in the supplementary information, the determination unit 12 determines whether the transport path can be formed according to the use situation of the transport path in the time zone including the desired formation time. If the transport path is vacant at the desired formation time of the transport path, the determination unit 12 determines that the transport path can be formed. On the other hand, in a case where the transport path is congested or there is no available drone at the desired formation time of the transport path, the determination unit 12 determines that the transport path cannot be formed.

For example, in a case where the type of the package is included in the supplementary information, the determination unit 12 determines whether the transport path can be formed according to the type of the package. For example, the determination unit 12 determines whether the transport path can be formed according to the weight of the package. When the weight of the package is less than the important level at which the drone can transport the package, the determination unit 12 determines that the transport path can be formed. On the other hand, in a case where the weight of the package is greater than or equal to the important level at which the drone can transport the package, the determination unit 12 determines that the transport path cannot be formed. For example, the determination unit 12 determines whether the transport path can be formed according to the size of the package. If the package is smaller than the size in which the transport path can be used, the determination unit 12 determines that the transport path can be formed. On the other hand, in a case where the size of the package is larger than the size in which the transport path can be used, the determination unit 12 determines that the transport path cannot be formed. For example, in a case where the package is fragile, dangerous article, or valuable article, the determination unit 12 determines that the transport path cannot be formed.

The transport path formation unit 13 acquires the transport path formation instruction from the determination unit 12. The transport path formation unit 13 generates formation information of the transport path in response to the transport path formation instruction. The transport path formation unit 13 generates formation information for forming a transport path between a start point and an end point included in the transport path formation instruction. The formation information includes a start point, a route, and an end point of the transport path. The transport path formation unit 13 outputs the generated formation information to the formation information output unit 14.

Figure 3:
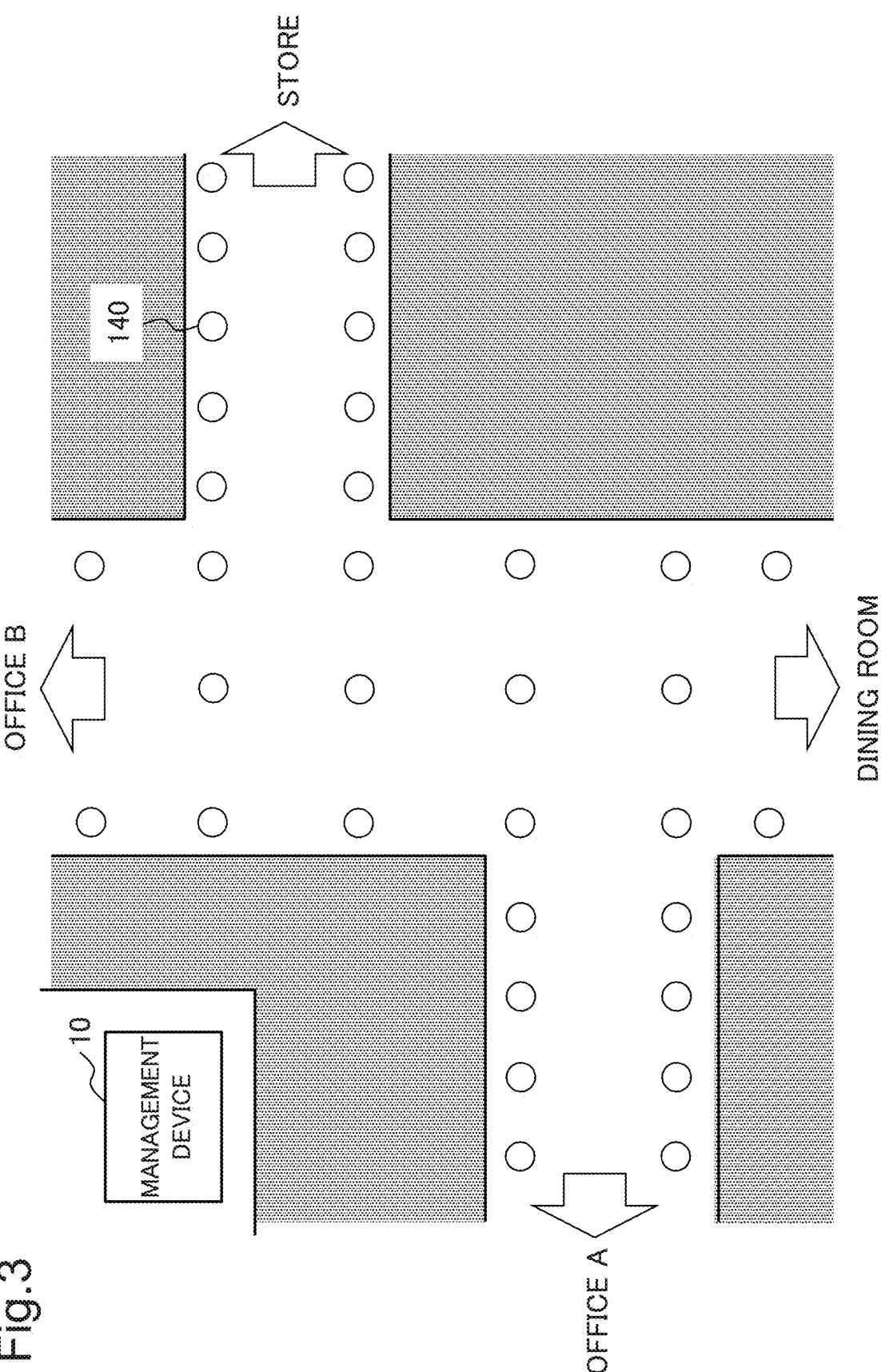
FIG. 3 is a conceptual diagram illustrating an indoor example in which a transport path to be managed by the management device according to the first example embodiment is formed.

FIG. 3 is a conceptual diagram of an interior in which the transport path is formed as viewed from above. A plurality of guide lights 140 are disposed on the route on which the transport path is formed. The plurality of guide lights 140 are disposed at positions where images can be captured by a camera mounted on the drone using the transport path. For example, the plurality of guide lights 140 are disposed on a ceiling, a wall, a floor, or the like. The arrangement place of the plurality of guide lights 140 is not particularly limited as long as the position can be imaged by the camera of the drone. FIG. 3 illustrates an office A, an office B, a store, and a dining room as places selectable as a transport source/transport destination. The place selectable as the transport source/transport destination can be set to any place as long as the plurality of guide lights 140 can be disposed on the intermediate route. Although not illustrated in FIG. 3, a communication device for performing wireless communication using a communication system such as Bluetooth (registered trademark) or Wi-Fi (registered trademark) is disposed indoors where a transport path is formed. A terminal device (not illustrated) on the management side that manages the management device 10 and the drone transmit and receive radio signals to and from each other by wireless communication. The communication system between the terminal device on the management side and the drone is not particularly limited as long as it can be used indoors.

FIG. 3 illustrates the management device 10. The management device 10 is connected to the guide light 140 by wired communication via a cable or wireless communication via a radio signal. A place where the management device 10 is disposed is not particularly limited. For example, the management device 10 may be mounted on a cloud or a server, or may be arranged in the vicinity of the guide light 140.

The formation information output unit 14 acquires formation information from the transport path formation unit 13. The formation information output unit 14 outputs the acquired formation information to the guide light 140 located on the route on which the transport path is formed. The guide light 140 that has acquired the formation information is lit according to the formation information.

Figure 4:
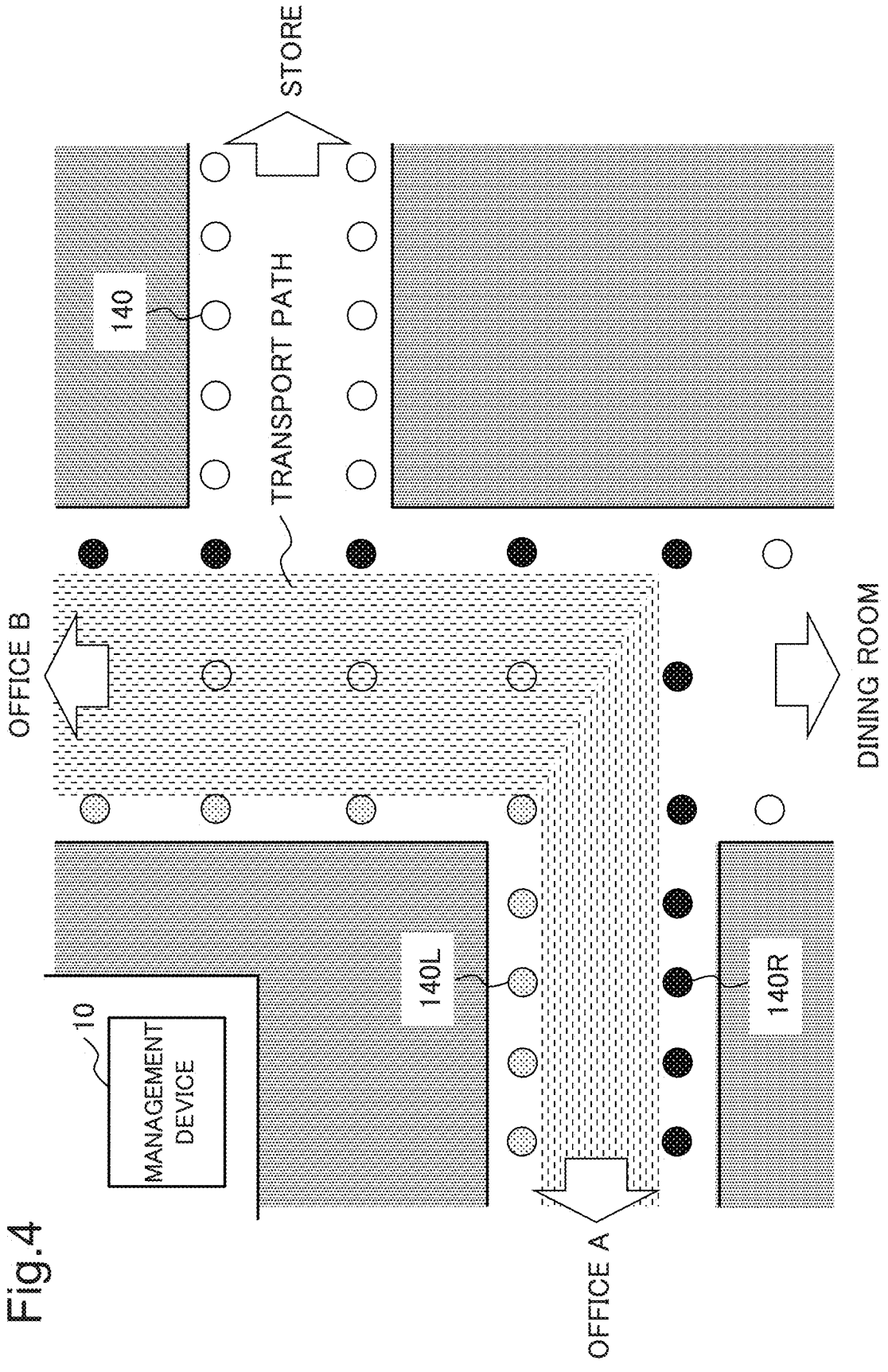
FIG. 4 is a conceptual diagram illustrating an example in which a transport path to be managed by the management device according to the first example embodiment is formed indoors.

FIG. 4 is a conceptual diagram illustrating an example in which a transport path is formed by turning on the guide light 140 that has acquired the formation information according to the formation information. In the example of FIG. 4, a transport path is formed between the office A and the office B. A guide light 140L at the position on the left side with respect to the traveling direction and a guide light 140R at the position on the right side with respect to the traveling direction are lit in different colors from each other from the office A toward the office B so that the traveling direction becomes clear. For example, the guide light 140L lights up in green, and the guide light 140L lights up in red. The drone can navigate the transport path from the office A to the office B by following at least one of the guide light 140L and the guide light 140R.

In the example of FIG. 4, the transport path is hatched, but there is no change in a floor surface or the like below the transport path before and after formation of the transport path. The light may be projected onto the floor surface below the transport path at the time of forming the transport path. For example, a projector may be installed indoors where a transport path is formed, and light may be projected from the projector toward the floor surface. In that case, the drone can navigate the transport path based on the light projected on the floor surface below the transport path.

The reception information output unit 15 acquires, from the determination unit 12, the reception information 115 including a determination result as to whether the transport path can be formed. The reception information output unit 15 transmits the acquired reception information 115 to the terminal device used by the requesting party of the transport information 111.

FIG. 5 is an example of the reception information 115. FIG. 5 illustrates the reception information 115 for the transport information 111 of FIG. 2. The reception information 115 of FIG. 5 includes the determination result "The following application for use has been received." FIG. 5 also illustrates the transport information 111 of FIG. 2, but the transport information 111 may not be included in the reception information 115. The reception information 115 of FIG. 5 includes a scheduled pickup and delivery time (11:30) of the package. For example, at the scheduled pickup and delivery time (11:30), the drone that carries a package or a person in charge of loading a package on the drone arrives at a place where a requesting party (123 . . . 321) of the office A that is a transport source is present. When the package (document P) to be transported from the requesting party (123 . . . 321) is mounted on the drone, the drone moves toward the recipient (456 . . . 654) of the transport destination office B using the transport path. The drone that uses the transport path moves from the transport source that is the start point to the transport destination that is the end point, following the illuminated guide light 140.

[Drone]

Figure 6:
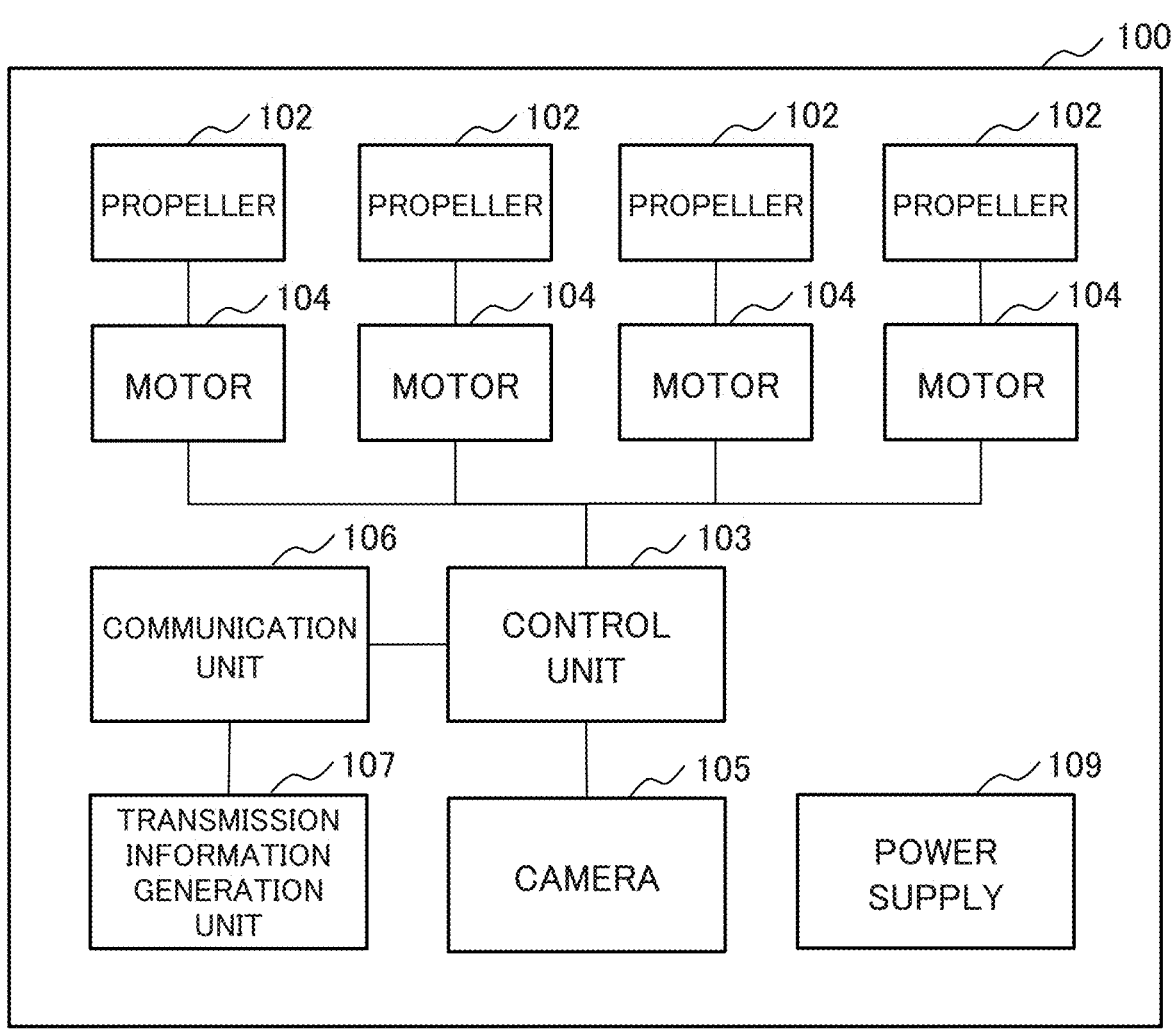
FIG. 6 is a block diagram illustrating an example of a configuration of a drone that uses a transport path to be managed by the management device according to the first example embodiment.
Figure 7:
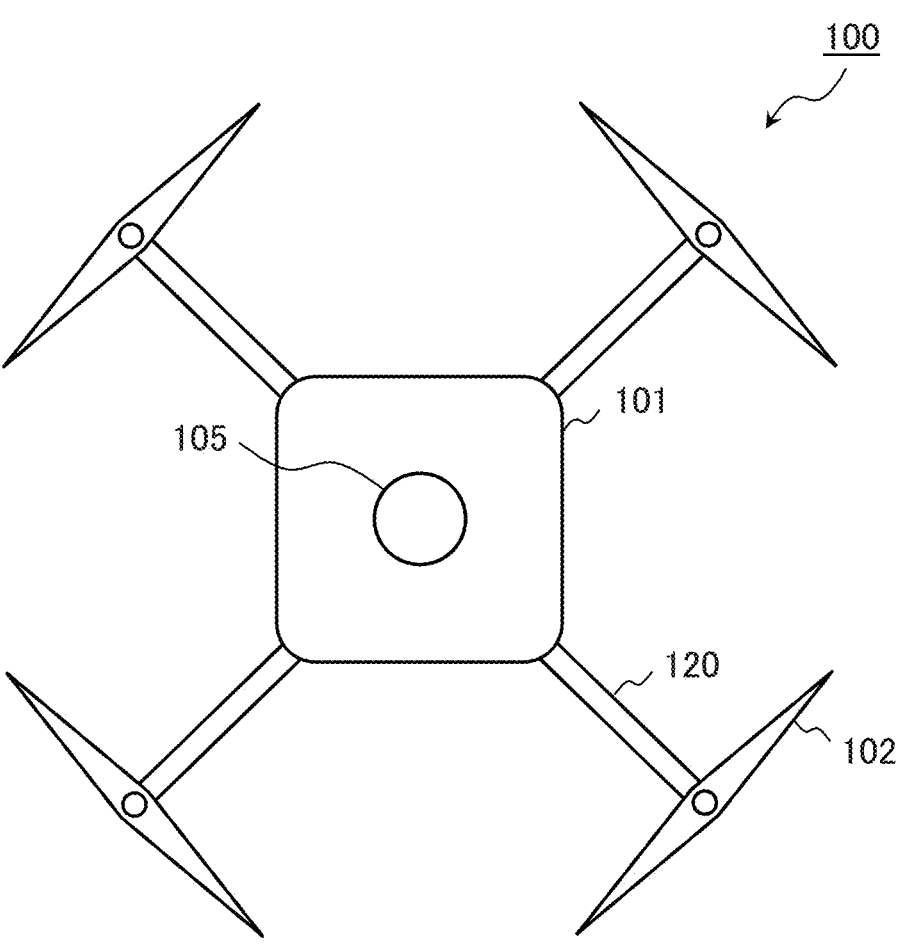
FIG. 7 is a conceptual diagram illustrating an example of an appearance of a drone that uses a transport path to be managed by the management device according to the first example embodiment.

Next, an example of a drone that uses a transport path will be described with reference to the drawings. FIGS. 6 and 7 are conceptual diagrams illustrating an example of a configuration of a drone 100 using a transport path. FIG. 6 is a block diagram for explaining a functional configuration of the drone 100. FIG. 7 is a top view of the drone 100. A side view, a rear view, a bottom view, a slope view, and the like of the drone 100 are omitted. For example, the drone 100 is equipped with a remote identification (RID) device that transmits transmission information including a registration number, a manufacturing number, position information, time, and authentication information.

The drone 100 includes a main body 101, a propeller 102, a control unit 103, a motor 104, a camera 105, a communication unit 106, a transmission information generation unit 107, and a power supply 109. The control unit 103, the communication unit 106, the transmission information generation unit 107, and the power supply 109 are stored inside the main body 101. Most of the camera 105 except for the lens is stored inside the main body 101. FIG. 7 illustrates a lens portion of the camera 105 on the upper portion of the main body 101. The drone 100 has a package carrying function (not illustrated). For example, the drone 100 carries a package by storing the package inside the main body 101, hanging down the package from the main body 101, or loading the package on the main body 101. In a case where a package is placed on the upper portion of the main body 101, the camera 105 may be detached from the main body 101 so that the camera 105 can be attached above or around the package.

The main body 101 is a housing that stores the control unit 103, the camera 105, the communication unit 106, the transmission information generation unit 107, the power supply 109, and the like. At least one propeller 102 for causing the drone 100 to fly is attached to the main body 101. For example, the main body 101 is provided with a space for storing a package therein, a mechanism for hanging down a package, a place for placing a package thereon, and the like depending on the application. The shape and material of the main body 101 are not particularly limited.

The propeller 102 is a mechanism that causes the drone 100 to fly. The propeller 102 is also called a rotor or a rotary wing. The propeller 102 is rotatably fixed to the main body 101 by an arm 120. The propeller 102 is a blade for floating the main body 101 by rotating. The motor 104 for rotating the propeller 102 is installed in the propeller 102. The size and attachment position of the propeller 102 in FIG. 7 are not sufficiently designed for flying the drone 100, but are conceptual. In the example of FIG. 7, four propellers 102 are installed on the main body 101 of the drone 100. The rotation speeds of the plurality of propellers 102 are controlled independently of each other.

FIG. 7 shows, by way of example, a quadcopter including four propellers 102. The drone 100 may include a single propeller 102 or may be a multi-copter including a plurality of propellers 102. Considering the posture stability in the air and the flight performance, the drone 100 may be a multi-copter including a plurality of propellers 102. In a case where the plurality of propellers 102 are provided in the drone 100, the sizes of the propellers 102 may be different. The rotating surfaces of the plurality of propellers 102 may be different from each other.

The motor 104 is installed in each of the plurality of propellers 102. The motor 104 is a drive mechanism for rotating the propeller 102. The motor 104 rotates the propeller 102 under the control of the control unit 103.

The control unit 103 is a control device that controls the drone 100. For example, the control unit 103 is implemented by a control device such as a microcomputer and a micro-controller. The control unit 103 controls the rotation of the propeller 102. The control unit 103 controls the rotation speed of each propeller 102 by driving and controlling the motor 104 of each propeller 102.

The control unit 103 controls the navigation of the drone 100 by controlling the rotation speed of each propeller 102 according to the feature included in the image captured by the camera 105. For example, the control unit 103 may cause the drone 100 to navigate by controlling the rotation of the propeller 102 according to a preset navigation route. For example, the control unit 103 may cause the drone 100 to navigate by controlling the rotation of the propeller 102 according to a preset flight condition. For example, the flight condition is a condition in which the operation performed by the drone 100 is summarized in a table form. The navigation route and the flight conditions may be stored in a storage unit (not illustrated).

The control unit 103 controls imaging of the camera 105. The control unit 103 causes the camera 105 to capture an image at a predetermined timing. The control unit 103 acquires an image captured by the camera 105. In the case of providing an image to the management side of the transport path, the control unit 103 outputs the acquired image to the communication unit 106.

While the drone 100 is navigating inside the transport path, the control unit 103 controls the rotation of the propeller 102 based on the position of the guide light 140 included in the image captured by the camera 105. The control unit 103 controls the rotation of the propeller 102 so that the drone 100 navigates the transport path according to the position of the guide light 140 lit in the color to be referred to. For example, the control unit 103 controls the rotation of the propeller 102 so that the drone 100 navigates on the transport path according to the positions of the plurality of guide lights 140L disposed on the left side with respect to the traveling direction of the transport path. For example, the control unit 103 controls the rotation of the propeller 102 so that the drone 100 navigates the transport path according to the positions of the plurality of guide lights 140R disposed on the right side with respect to the traveling direction of the transport path. For example, the control unit 103 controls the rotation of the propeller 102 so that the drone 100 navigates the transport path according to the positions of the plurality of guide lights 140L and guide lights 140R disposed on both sides with respect to the traveling direction of the transport path.

The camera 105 is disposed to photograph the periphery of the drone 100. In the case of FIG. 7, the camera 105 is installed above the drone 100. The camera 105 captures an image around the drone 100. For example, a plurality of cameras 105 may be mounted on the drone 100 in order to photograph the front, the side, and the lower side of the drone 100. For example, the camera 105 may be disposed in a portion capable of capturing images in multiple directions by changing the aerial posture of the drone 100. The camera 105 captures an image under the control of the control unit 103. The camera 105 outputs the captured image data (also referred to as an image) to the control unit 103. An imaging lens is incorporated in the camera 105. The lens may be a zoom lens capable of changing a focal length. The lens may be provided with a protective member such as a protective film or a protective glass. The camera 105 may be equipped with an autofocus function for automatically focusing. The camera 105 may be equipped with a function applied to a general digital camera, such as a function of preventing camera shake. A specific structure of the camera 105 will not be described.

The transmission information generation unit 107 generates transmission information unique to the drone 100. The transmission information includes invariable information and variable information. The transmission information generation unit 107 generates transmission information including invariable information and variable information at a predetermined cycle. For example, the transmission information generation unit 107 generates the transmission information at a predetermined cycle of about 3 times per second. The invariable information includes registration information, a manufacturing number, authentication information, and the like of the drone 100. The invariable information may be stored in a storage unit (not illustrated). The variable information includes position information and time. For example, the transmission information generation unit 107 generates the position information using data collected by a positioning system such as a global positioning system (GPS). The transmission information generation unit 107 may acquire the position information of a position measurement device (not illustrated) from the position measurement device installed around the transport path. In a case where sensors capable of specifying the flight position are mounted on the drone 100, the transmission information generation unit 107 may generate the position information using the data collected by these sensors. Examples of such a sensor include a geomagnetic sensor, an acceleration sensor, a speed sensor, an altitude sensor, and a distance measuring sensor. The transmission information generation unit 107 outputs the generated transmission information to the communication unit 106.

The communication unit 106 receives a radio signal transmitted from the management side. The communication unit 106 acquires a signal including transmission information generated by the transmission information generation unit 107 and an image captured by the camera 105. The transmission information includes registration information, a manufacturing number, position information, time, authentication information (also referred to as identification information), and the like of the drone 100. The registration information, the manufacturing number, the authentication information, and the like of the drone 100 are information that does not change during use of the transport path (also referred to as invariable information). The position information and the time are information (also referred to as variable information) that is updated as needed. The communication unit 106 transmits a signal including transmission information and an image. For example, the communication unit 106 transmits a signal at a transmission cycle of one or more times per second by a communication system such as Bluetooth (registered trademark) or Wi-Fi (registered trademark). A signal transmitted from the communication unit 106 is received by the management device 10.

The power supply 109 is a general secondary battery having a charging function. The power supply 109 is a power source of the drone 100. The power supply 109 is not particularly limited as long as the drone 100 can navigate the transport path. For example, the power supply 109 may be capable of controlling the charging of the power supply 109 and monitoring the charging amount of the power supply 109.

[Control Unit]

Figure 8:
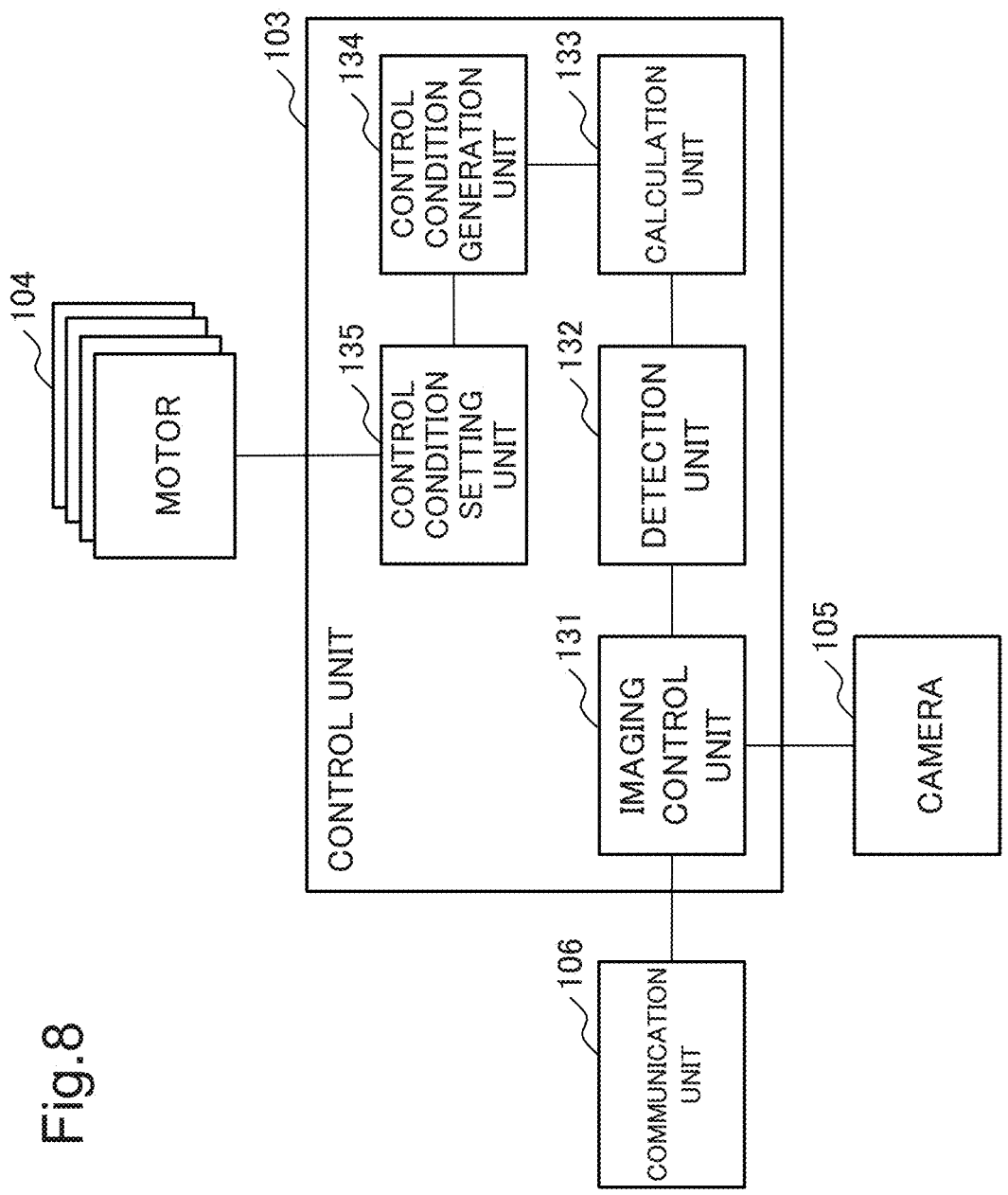
FIG. 8 is a block diagram illustrating an example of a configuration of a control unit included in a drone that uses a transport path to be managed by the management device according to the first example embodiment.

Next, the configuration of the control unit 103 mounted on the drone 100 will be described in detail. FIG. 8 is a block diagram illustrating an example of a configuration of the control unit 103. The control unit 103 includes an imaging control unit 131, a detection unit 132, a calculation unit 133, a control condition generation unit 134, and a control condition setting unit 135.

The imaging control unit 131 controls imaging of the camera 105. The imaging control unit 131 causes the camera 105 to capture an image at a predetermined timing. The imaging control unit 131 acquires an image captured by the camera 105. The imaging control unit 131 outputs the acquired image to the detection unit 132. In a case where the image is provided to the management side of the transport path, the imaging control unit 131 outputs the acquired image to the communication unit 106. The imaging condition of the image used by the imaging control unit 131 and the imaging condition of the image to be output to the communication unit 106 may be set to different conditions. For example, the imaging condition of an image used by the imaging control unit 131 is set to a condition under which an image is captured at a high frequency with a low resolution to such an extent that the position of the guide light 140 can be detected. For example, the imaging condition of the image output to the communication unit 106 is set to a condition under which an image is captured at a low frequency with a high resolution to such an extent that the situation around the drone 100 can be verified. By setting the imaging conditions in this manner, it is possible to separate the information required for flight control and the information required for verification of the surrounding situation.

The detection unit 132 acquires an image captured by the camera 105 from the imaging control unit 131. The detection unit 132 detects lighting of the guide light 140 from the acquired image. The detection unit 132 extracts a lighting color of the guide light 140 to be referred among the detected lighting of the guide light 140. For example, the guide light 140L on the left side with respect to the traveling direction of the transport path lights up in green, and the guide light 140R on the right side with respect to the traveling direction of the transport path lights up in red. Based on the lighting of the guide light 140 extracted from the image, the detection unit 132 specifies the positions of the guide light 140 and the own device (drone 100) in the area where the transport path is formed. The detection unit 132 outputs the position of the guide light 140 and the position of the own device (drone 100) extracted from the image to the calculation unit 133.

For example, the detection unit 132 specifies the position of the own device (drone 100) on the transport path according to the lighting color (green) of the guide light 140L on the left side of the transport path. For example, the detection unit 132 specifies the position of the own device (drone 100) on the transport path according to the lighting color (red) of the guide light 140R on the right side of the transport path. The detection unit 132 may specify the position of the own device (drone 100) on the transport path according to lighting colors (Green, Red) of the guide lights 140 on both banks.

The detection unit 132 may specify the position of the own device (drone 100) according to not only the lighting color of the guide light 140 but also the feature extracted from the image. For example, the detection unit 132 may specify the position of the own device (drone 100) according to features such as a ceiling surface, a wall surface, and a floor surface extracted from the image. For example, the detection unit 132 may specify the position of the own device (drone 100) according to features such as a door, illumination, a desk, a chair, a vending machine, and an emergency light extracted from the image.

The calculation unit 133 acquires the positions of the guide light 140 and the own device (drone 100) from the detection unit 132. In a case where the own device (drone 100) has a function of receiving a global positioning system (GPS) signal, the calculation unit 133 may acquire position information included in the GPS signal. The calculation unit 133 calculates a positional relationship between the guide light 140 and the own device (drone 100) according to the acquired positions of the guide light 140 and the own device (drone 100). The positional relationship calculated by the calculation unit 133 includes the distance between the guide light 140 and the own device (drone 100). The calculation unit 133 calculates the distance between the guide light 140 and the drone 100 specified by the detection unit 132. For example, the control timing of the drone 100 is set at a time interval at which the drone 100 can safely autonomously navigate the transport path. The control timing of the drone 100 may be common to all the drones 100 navigating the transport path, or may be different for each drone 100.

For example, the calculation unit 133 calculates the distance between the guide light 140 closest to the drone 100 and the drone 100. For example, the calculation unit 133 calculates a distance between a straight line passing through two guide lights 140 close to the drone 100 and the drone 100. For example, the calculation unit 133 calculates a distance between a curve smoothly connecting the plurality of guide lights 140 specified from the image and the drone 100. A method of calculating the distance between the guide light 140 and the drone 100 is not particularly limited as long as the drone 100 can navigate the transport path.

A distance (also referred to as a designated distance) of the drone 100 with respect to the guide light 140 is set in advance for each drone 100 using the transport path. The designated distance may be changed according to the use situation of the transport path. For example, the designated distance is defined by a minimum designated distance and a maximum designated distance. The drone 100 navigates a range (also referred to as a designated range) inside the minimum designated distance and the maximum designated distance set for each drone 100. For example, the minimum designated distance is set to a portion closest to the guide light 140 for each drone 100. For example, the maximum designated distance is set to a portion farthest from the guide light 140 with respect to the each drone 100. For example, the minimum designated distance and the maximum designated distance may be set at the center of the drone 100 or other portions.

The calculation unit 133 calculates the position (also referred to as an arrival prediction position) of the drone 100 at the next control timing. For example, the calculation unit 133 calculates the position of the drone 100 in a case where the navigation is continued in the direction/speed of the image capturing timing as the arrival prediction position. The calculation unit 133 calculates a target position (also referred to as a control target position) of the drone 100 at the next control timing. The control target position is set inside the designated range. For example, the control target position is set along an intermediate line between the boundary line of the minimum designated distance and the boundary line of the maximum designated distance. The calculation unit 133 outputs the calculated arrival prediction position and the control target position to the control condition generation unit 134.

The control condition generation unit 134 acquires the arrival prediction position and the control target position calculated by the calculation unit 133. The control condition generation unit 134 generates a control condition for controlling the drone 100 from the arrival prediction position toward the control target position. The control condition is a condition for rotating the propeller 102 that causes the drone 100 to fly. The control condition generation unit 134 calculates the traveling direction/speed of the drone 100 from the arrival prediction position according to the control target position. The control condition generation unit 134 sets the rotation speeds of the plurality of propellers 102 according to the traveling direction/speed. The control condition generation unit 134 outputs the generated control condition to the control condition setting unit 135.

The control condition setting unit 135 acquires the control condition from the control condition generation unit 134. The control condition setting unit 135 sets the control condition for the motor 104 at the next control timing subsequent to the imaging timing. The rotation speed of each propeller 102 is controlled by driving the motor 104 according to the control condition. As a result, the drone 100 travels in a direction/speed according to the control condition.

Figure 9:
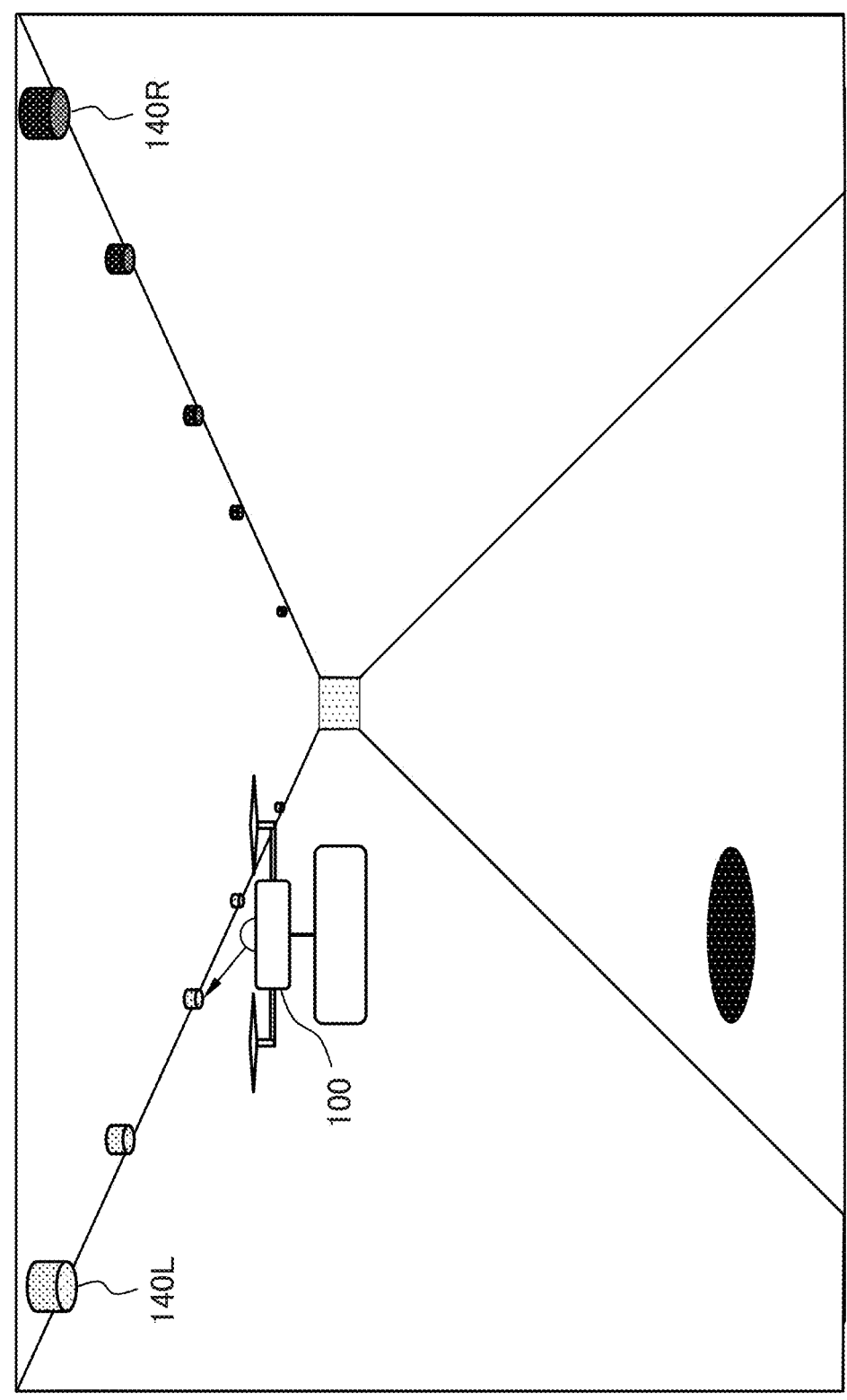
FIG. 9 is a conceptual diagram illustrating an example in which a drone moves on a transport path to be managed by the management device according to the first example embodiment.

FIG. 9 is a conceptual diagram illustrating an example in which the drone 100 navigates a transport path formed indoors. The plurality of guide lights 140 is disposed on the ceiling. The guide light 140L on the left side with respect to the traveling direction of the transport path and the guide light 140R on the right side with respect to the traveling direction of the transport path are lit in different colors. In the example of FIG. 9, the drone 100 flies while referring to the guide light 140L on the left side with respect to the traveling direction of the transport path.

Figure 10:
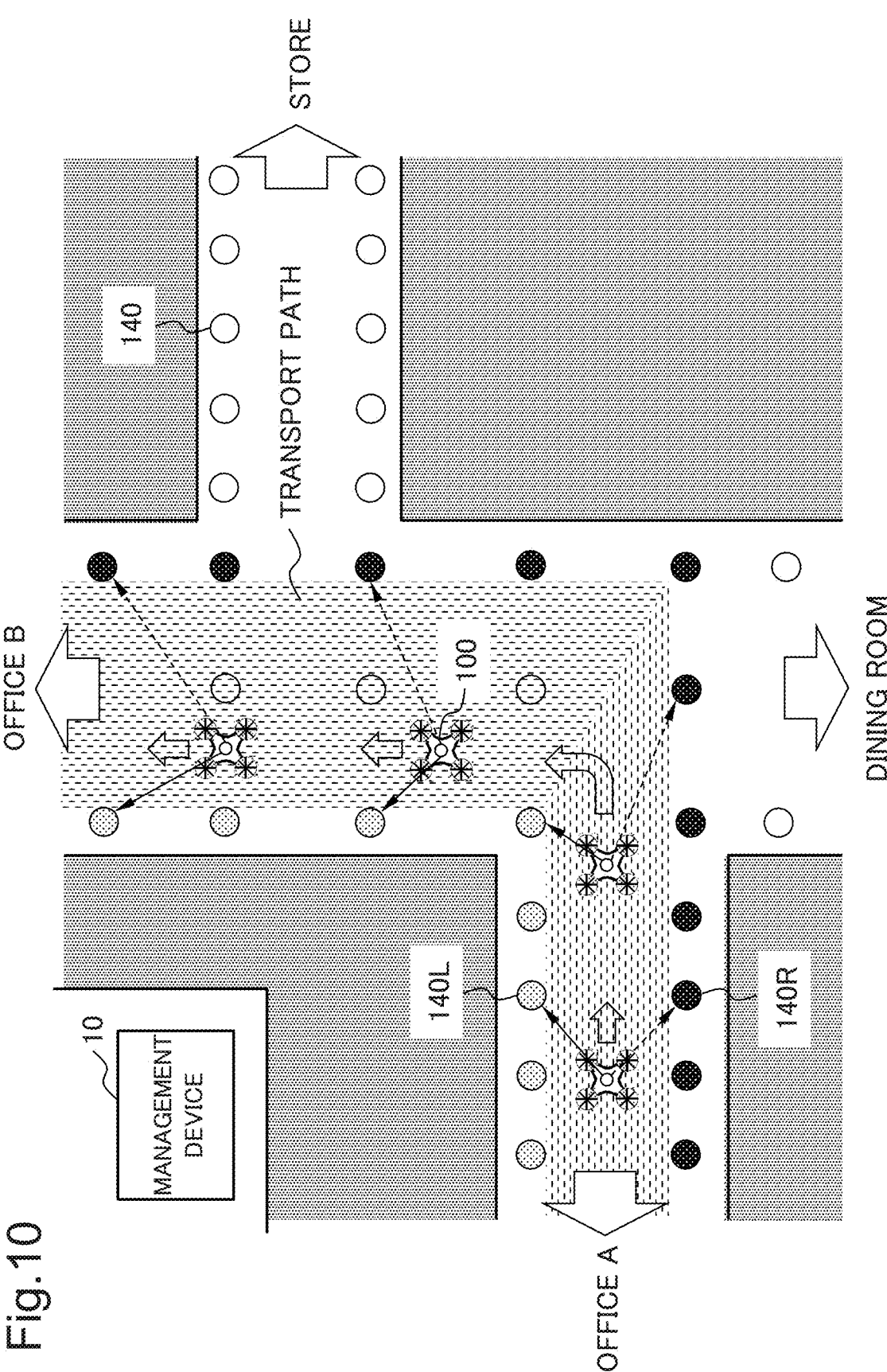
FIG. 10 is a conceptual diagram illustrating an example in which a drone moves on a transport path to be managed by the management device according to the first example embodiment.

FIG. 10 is a conceptual diagram illustrating an example in which the drone 100 moves on a transport path formed between the office A and the office B. The drone 100 moves on the transport path from the office A to the office B while referring to the guide light 140L disposed on the left side with respect to the traveling direction of the transport path and the guide light 140R disposed on the right side with respect to the traveling direction of the transport path.

Figure 11:
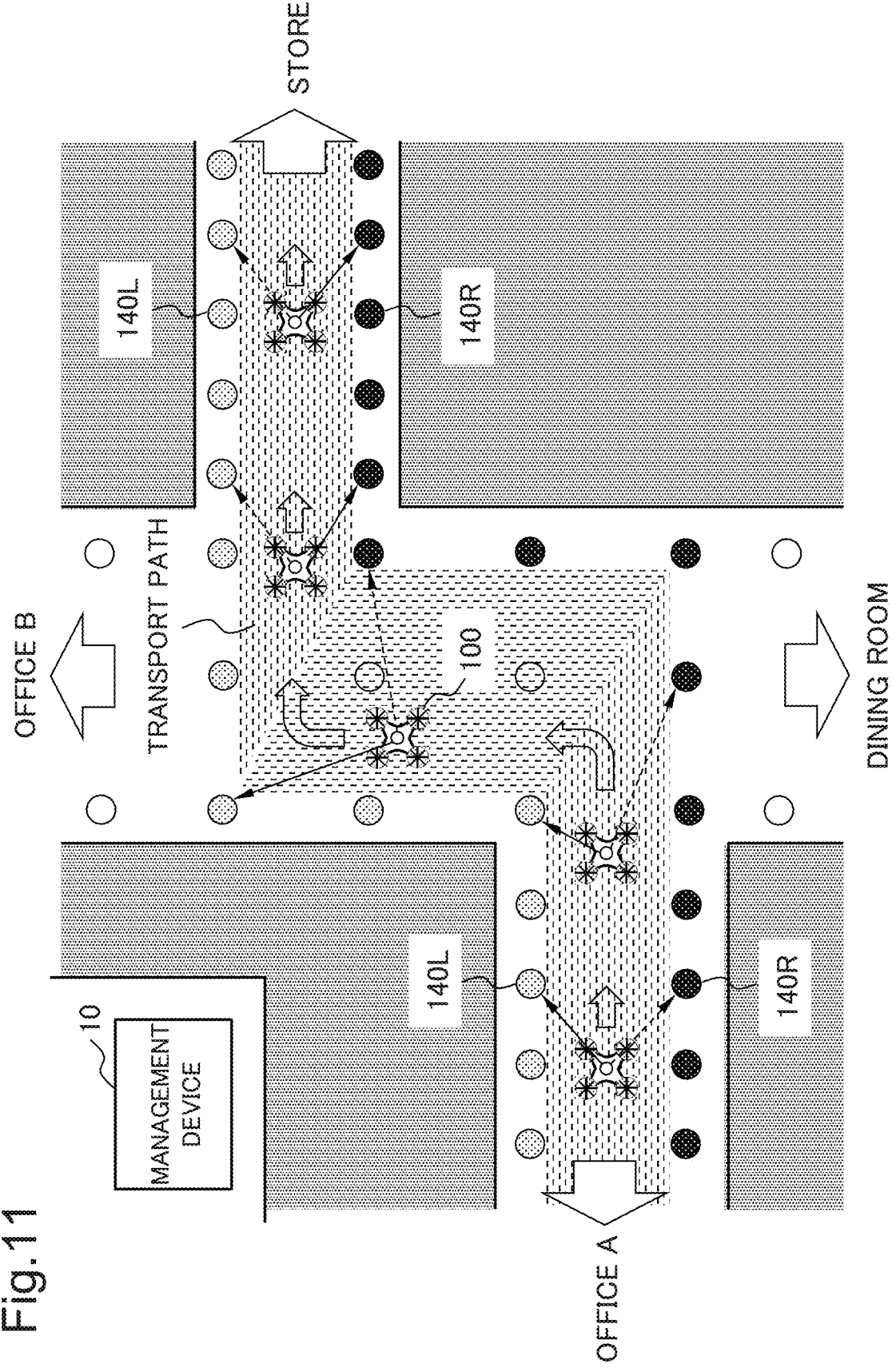
FIG. 11 is a conceptual diagram illustrating an example in which a drone moves on a transport path to be managed by the management device according to the first example embodiment.

FIG. 11 is a conceptual diagram illustrating an example in which the drone 100 moves on a transport path formed between the office A and the store. The drone 100 moves on the transport path from the office A toward the store while referring to the guide light 140L disposed on the left side with respect to the traveling direction of the transport path and the guide light 140R disposed on the right side with respect to the traveling direction of the transport path.

As illustrated in FIGS. 10 and 11, the management device 10 appropriately forms a transport path at a position where the guide light 140 is disposed in response to reception of the transport information 111. In a situation where the transport path is formed, since the guide light 140 is turned on, a person who uses the space where the transport path is formed can recognize that the transport path is formed. On the other hand, in a situation where the transport path is not formed, the guide light 140 is not turned on, and thus, for a person who uses the space where the transport path is formed, it is recognized as a normal indoor space. Even in a situation where the transport path is not formed, the guide light 140 may be turned on in a color different from that at the time of forming the transport path.

Figure 12:
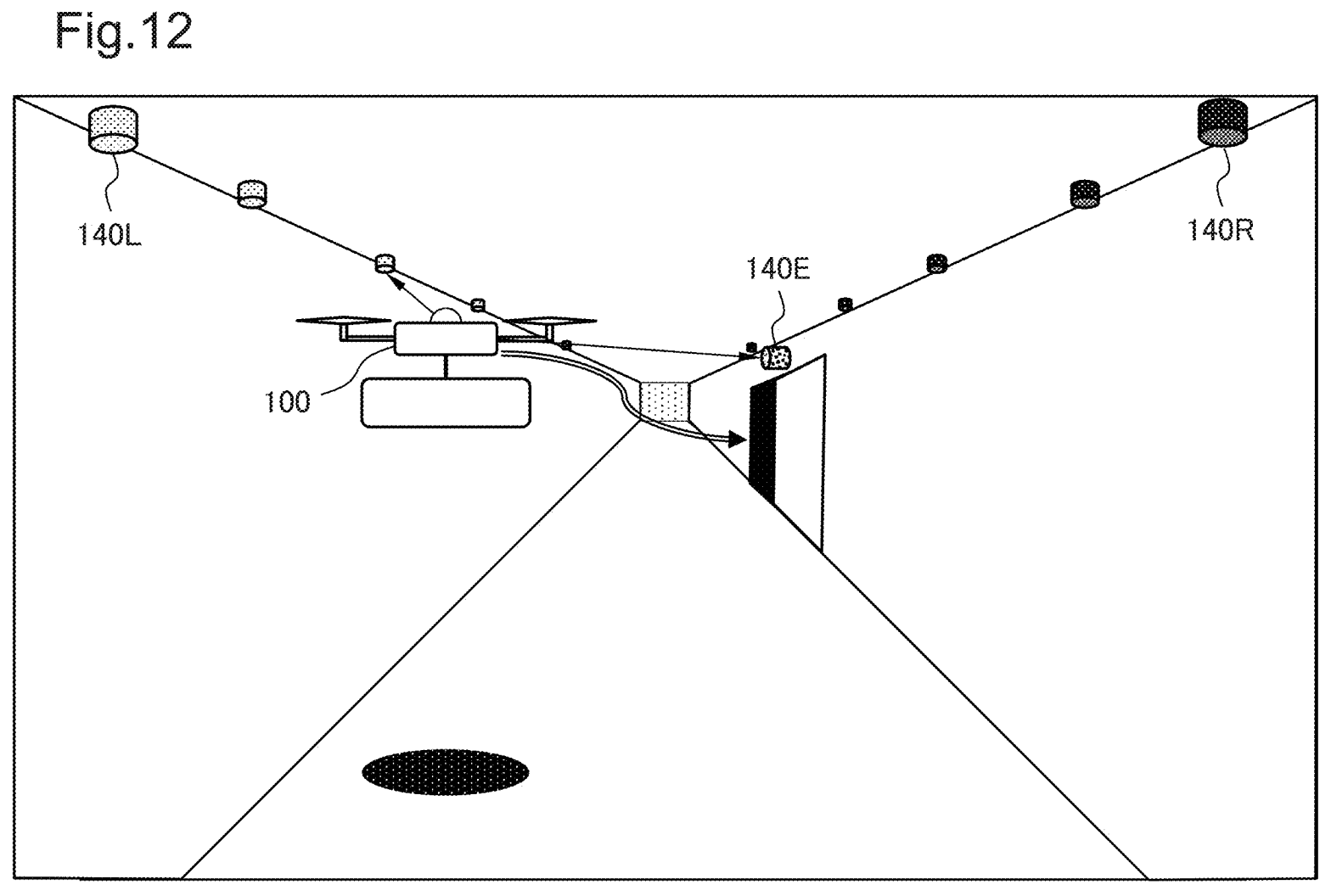

FIG. 12 is a conceptual diagram illustrating another example in which the drone 100 navigates a transport path formed indoors. FIG. 12 illustrates an example in which a transport path is formed over a plurality of floors of a building. For example, the transport path is formed over a plurality of floors of a building via an elevator or a staircase. In the example of FIG. 12, the drone 100 flies while referring to the guide light 140L on the left side with respect to the traveling direction of the transport path. On the right side of the transport path in the traveling direction, there is an elevator door. A guide light 140E is disposed above the elevator door. In the example of FIG. 12, the guide light 140E is lit in a color different from the guide light 140L and the guide light 140R. For example, the guide light 140L lights up in green, the guide light 140R lights up in red, and the guide light 140E lights up in yellow.

When detecting the guide light 140E indicating the position of the elevator, the drone 100 travels downward of the guide light 140E. During the period in which the transport path is formed, the normal use of the elevator is stopped. In the period in which the transport path is formed, the elevator car on which a person or a package is placed is stopped on a floor off the transport path. For example, the elevator car is controlled by the management side that manages the transport path. For example, control may be performed to stop the elevator car so as to avoid the transport path according to the formation information of the transport path. The elevator may be available in a floor not including the transport path.

(Operation)

Next, an example of the operation of the management device 10 forming the transport path and the operation of the drone 100 using the transport path will be described with reference to the drawings. Hereinafter, the operations of the management device 10 and the drone 100 will be described using a flowchart. Regarding the operation of the drone 100, the operation of the control unit 103 included in the drone 100 will be described.

[Management Device]

Figure 13:
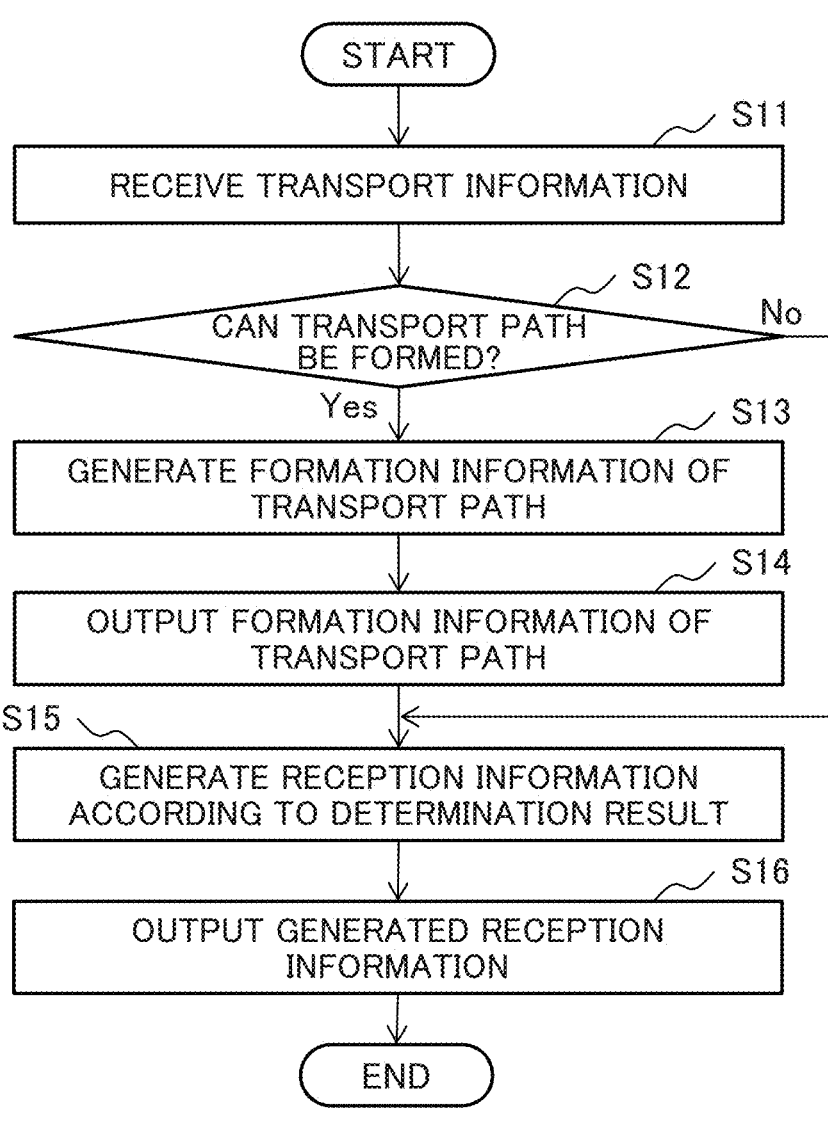
FIG. 13 is a flowchart for explaining an example of an operation of the management device according to the first example embodiment.

FIG. 13 is a flowchart for explaining an example of the operation of the management device 10. In the description along the flowchart of FIG. 13, the management device 10 will be described as an operation subject.

In FIG. 13, first, the management device 10 receives transport information 111 from a requesting party who requests transporting of a package using a transport path (step S11).

The management device 10 determines whether the transport path can be formed according to the received transport information 111 (step S12). In a case where the transport path can be formed (Yes in step S12), the management device 10 generates the formation information of the transport path (step S13). On the other hand, in a case where the transport path cannot be formed (No in step S12), the process proceeds to step S15.

After step S13, the management device 10 outputs formation information 113 of the transport path to the guide light 140 installed on the transport path relevant to the transport information 111 (step S14). By turning on the guide light 140 according to the formation information 113, a transport path according to the transport information 111 is formed.

After step S14 or in the case of No in step S12, the management device 10 generates reception information 115 according to the determination result (step S15). In a case subsequent to step S14, the management device 10 generates reception information 115 indicating that the transport information 111 has been received. On the other hand, in the case of No in step S12, the management device 10 generates reception information 115 indicating that the transport information 111 has not been received.

Next, the management device 10 outputs the generated reception information 115 to the requesting party of the transport information 111 (step S16). The user who is the requesting party who has browsed the reception information 115 can take an action according to the reception information 115. For example, in a case where the transport path is formed, the user who is the requesting party mounts a package to be transported on the drone 100 by a designated time. For example, in a case where the transport path is not formed, the user who is the requesting party transports the package to be transported by means that does not use the transport path.

The order of generation/output of the formation information of the transport path and generation/output of the reception information may be switched. For example, steps S15 to S16 may be executed before steps S13 to S14. Steps S13 to S14 and steps S15 to S16 may be performed in parallel.

[Drone]

Figure 14:
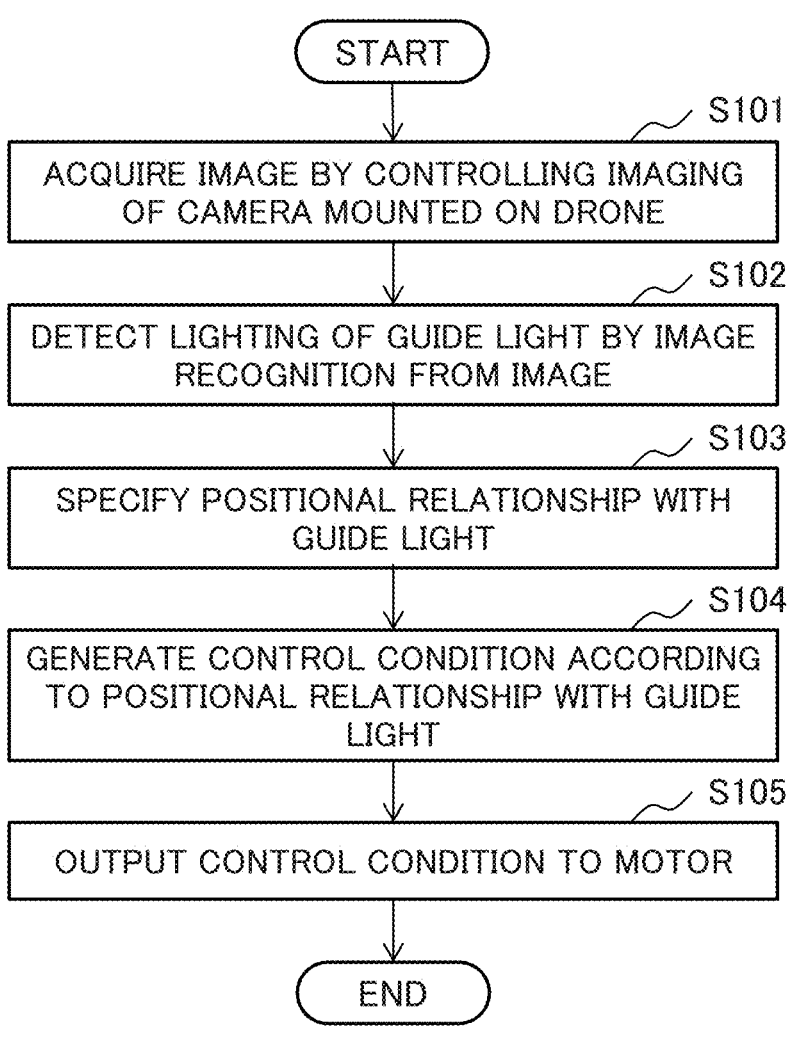
FIG. 14 is a flowchart for explaining an example of an operation of a drone that uses a transport path to be managed by the management device according to the first example embodiment.

FIG. 14 is a flowchart for explaining an example of the operation of the control unit 103 included in the drone 100. In the description along the flowchart of FIG. 14, the control unit 103 will be described as an operation subject.

In FIG. 14, first, the control unit 103 controls imaging of the camera 105 mounted on the drone 100 to acquire an image (step S101). The image captured by the camera 105 includes the guide light 140 installed indoors.

Next, the control unit 103 detects lighting of the guide light 140 to be referred by image recognition from the image captured by the camera 105 (step S102).

Next, the control unit 103 calculates a positional relationship between the drone 100 and the guide light 140 (step S103). For example, the control unit 103 calculates the distance between the drone 100 and the guide light 140 as the positional relationship between the guide light 140 and the drone 100.

Next, the control unit 103 generates a control condition according to the positional relationship between the drone 100 and the guide light 140 (step S104). The control unit 103 generates a control condition for moving from the transport source toward the transport destination.

Next, the control unit 103 outputs the generated control condition to the motor 104 (step S105). When the motor 104 is driven according to the control condition, the drone 100 can travel inside the transport path. In a case where the drone has not arrived at the transport destination which is the destination, the process returns to step S101 after step S105, and the use of the transport path is continued.

As described above, the management device according to the present example embodiment includes the reception unit, the determination unit, the reception information output unit, the transport path formation unit, and the formation information output unit. The reception unit receives transport information relevant to the application for use of the aerial transport path formed indoors. The determination unit determines whether the aerial transport path can be formed according to the transport information. The reception information output unit outputs reception information including a determination result regarding whether the aerial transport path can be formed to a requesting party of the transport information. The transport path formation unit generates formation information of the aerial transport path according to the determination result that the aerial transport path can be formed. The formation information output unit outputs formation information of the aerial transport path to a guide light installed indoors to form the aerial transport path.

In the present example embodiment, it is determined whether the aerial transport path can be formed based on the determination result relevant to the transport information. In the present example embodiment, when it is determined that the aerial transport path can be formed, the formation information of the aerial transport path is output to a guide light installed indoors to form the aerial transport path. As a result, according to the present example embodiment, the aerial transport path used by the drone to transport the package can be formed indoors.

In one aspect of the present example embodiment, the reception unit receives the transport information including a transport source and a transport destination of a package to be transported. The transport path formation unit generates formation information for turning on a guide light installed between the transport source and the transport destination. According to the present aspect, the aerial transport path can be formed according to the transport source and the transport destination included in the transport information.

In one aspect of the present example embodiment, the reception unit receives the transport information including supplementary information. The determination unit determines whether the aerial transport path can be formed according to the supplementary information. According to the present example embodiment, the aerial transport path can be formed according to the supplementary information included in the transport information.

In one aspect of the present example embodiment, the reception unit receives the transport information including a desired transport path to be used as supplementary information. The determination unit determines whether the aerial transport path including the transport path desired to be used can be formed according to the desired transport path included in the supplementary information. According to the present aspect, the aerial transport path can be formed according to not only the transport source and the transport destination but also the transport path desired to be used.

In one aspect of the present example embodiment, the reception unit receives the transport information including a type of a package to be transported as supplementary information. The determination unit determines whether the aerial transport path can be formed according to the type of the package. According to the present aspect, the aerial transport path can be formed according to the type of package.

Second Example Embodiment

Next, a management device according to a second example embodiment will be described with reference to the drawings. In the present example embodiment, the management device identifies that a package is mounted on the drone, and causes the identified package to be carried by the drone.

(Configuration)

Figure 15:
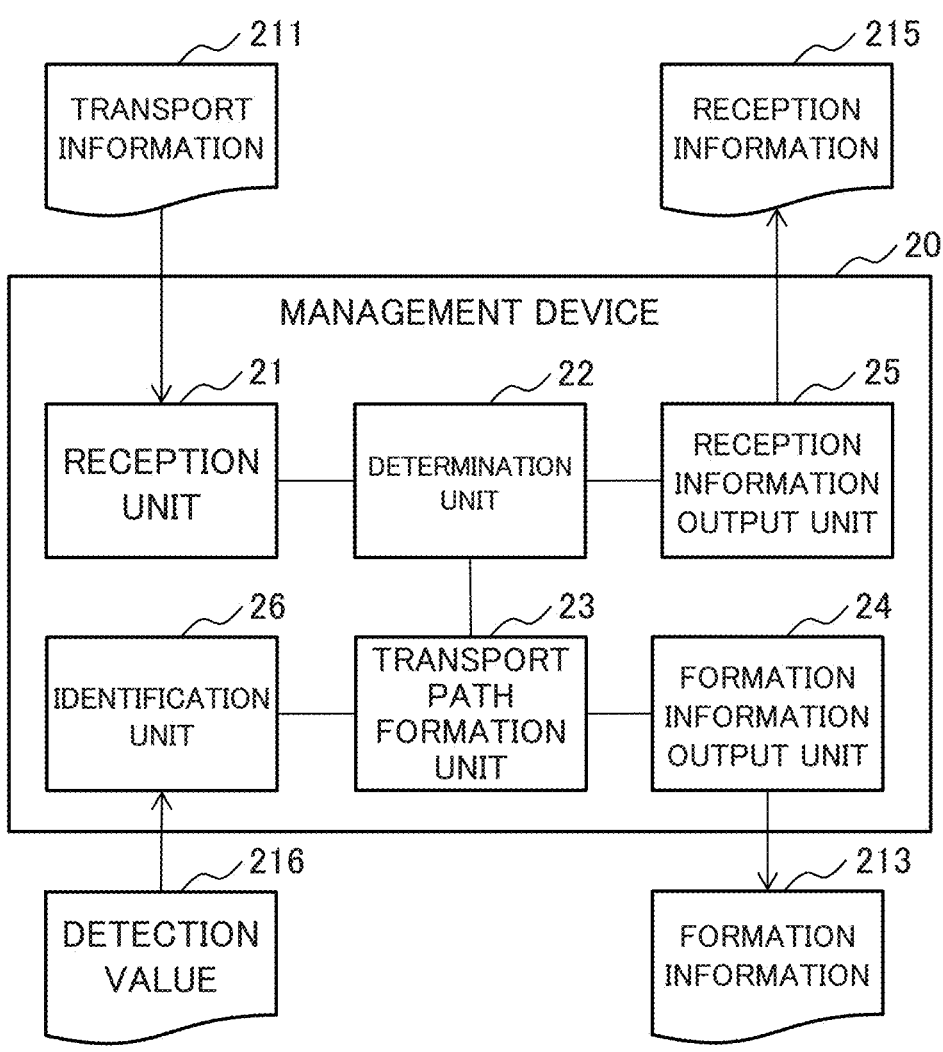
FIG. 15 is a block diagram illustrating an example of a configuration of a management device according to a second example embodiment.

FIG. 15 is a block diagram illustrating an example of a configuration of a management device 20 according to the present example embodiment. The management device 20 includes a reception unit 21, a determination unit 22, a transport path formation unit 23, a formation information output unit 24, a reception information output unit 25, and an identification unit 26. The identification unit 26 acquires a detection value detected by a detector mounted on a drone to be described later.

The reception unit 21 has a configuration similar to that of the reception unit 11 according to the first example embodiment. The reception unit 21 receives transport information 211 relevant to an application for use of the transport path formed indoors. The transport information 211 is input via a terminal device (not illustrated). The reception unit 21 outputs the received transport information 211 to the determination unit 22.

The determination unit 22 has a configuration similar to that of the determination unit 12 according to the first example embodiment. The determination unit 22 acquires the transport information 211 from the reception unit 21. The determination unit 22 determines whether the transport path can be formed according to the transport information 211. In any case where it is possible/impossible to form the transport path, the determination unit 22 outputs reception information 215 including the determination result of whether the transport path can be formed to the reception information output unit 25. When the transport path can be formed, the determination unit 22 outputs a formation instruction of the transport path to the transport path formation unit 23. The formation instruction of the transport path includes a start point and an end point of the transport path.

The reception information output unit 25 has a configuration similar to that of the reception information output unit 15 of the first example embodiment. The reception information output unit 25 acquires, from the determination unit 22, the reception information 215 including a determination result as to whether the transport path can be formed. The reception information output unit 25 transmits the acquired reception information 215 to the terminal device used by the requesting party of the transport information 211.

In the requesting party who has acquired the determination result that the transport path can be formed, the package to be transported is mounted on the drone. A detector (described later) is mounted on the drone. The drone outputs a detection value 216 detected by the detector mounted on the own device to the identification unit 26. Whether the drone is mounted with a package is identified by the identification unit 26.

The identification unit 26 acquires the detection value 216 detected by the detector mounted on the drone. The identification unit 26 identifies whether a package is mounted on the drone according to the acquired detection value 216. In a case where it is identified that a package is mounted on the drone according to the detection value 216, the identification unit 26 outputs a package mounting notification notifying that the package is mounted to the transport path formation unit 23. The identification unit 26 may output the package mounting notification to the transport path formation unit 23.

For example, the identification unit 26 acquires the detection value 216 indicating detection of an object by a detector mounted on the drone. In that case, the detector is implemented by an optical sensor or an acoustic sensor. The optical sensor detects an object in accordance with shielding of light due to mounting of a package. The acoustic sensor detects an object in accordance with reflection of sound due to mounting of a package. As long as the presence or absence of the package can be detected, the detector is not limited to the optical sensor or the acoustic sensor. When acquiring the detection value 216, the identification unit 26 identifies that a package is mounted on the drone.

For example, the identification unit 26 acquires the weight of the package detected by the detector mounted on the drone as the detection value 216. In this case, the detector is implemented by a sensor capable of measuring a weight such as a weight sensor. When the weight of the package is acquired as the detection value 216, the identification unit 26 determines whether the detection value 216 (weight) matches the weight of the package to be transported. In a case where the detection value 216 (weight) matches the weight of the package to be transported, the identification unit 26 identifies that the package is mounted on the drone. However, the detection value 216 (weight) and the weight of the package to be transported may not completely coincide with each other.

For example, the identification unit 26 acquires an identification code detected by a detector mounted on the drone as the detection value 216. For example, the identification code is a two-dimensional code such as a barcode or a quick response (QR) code (registered trademark). In that case, the detector is implemented by a code reader, a camera, or the like capable of reading the identification code. The identification code may be an array of symbols such as characters and numbers. In a case where the identification code is acquired as the detection value 216, the identification unit 26 identifies that a package is mounted in a case where the detection value 216 matches the identification code of the package to be transported. The detection value 216 (identification code) and the weight of the package to be transported needs to be completely match.

The transport path formation unit 23 has a configuration similar to that of the transport path formation unit 13 according to the first example embodiment. The transport path formation unit 23 acquires the transport path formation instruction from the determination unit 22. The transport path formation unit 23 acquires the package mounting notification from the identification unit 26. When acquiring the package mounting notification, the transport path formation unit 23 generates the formation information of the transport path according to the transport path formation instruction. The transport path formation unit 23 generates formation information for forming a transport path between a start point and an end point included in the transport path formation instruction. The formation information includes a start point, a route, and an end point of the transport path. The transport path formation unit 23 outputs the generated formation information to the formation information output unit 24.

The formation information output unit 24 has a configuration similar to that of the formation information output unit 24 of the first example embodiment. The formation information output unit 24 acquires the formation information from the transport path formation unit 23. The formation information output unit 24 outputs the acquired formation information to the guide light located on the route on which the transport path is formed. For example, the formation information output unit 24 may output the formation information in accordance with the package mounting notification output from the identification unit 26. The guide light that has acquired the formation information is lit according to the formation information.

[Drone]

Figure 16:
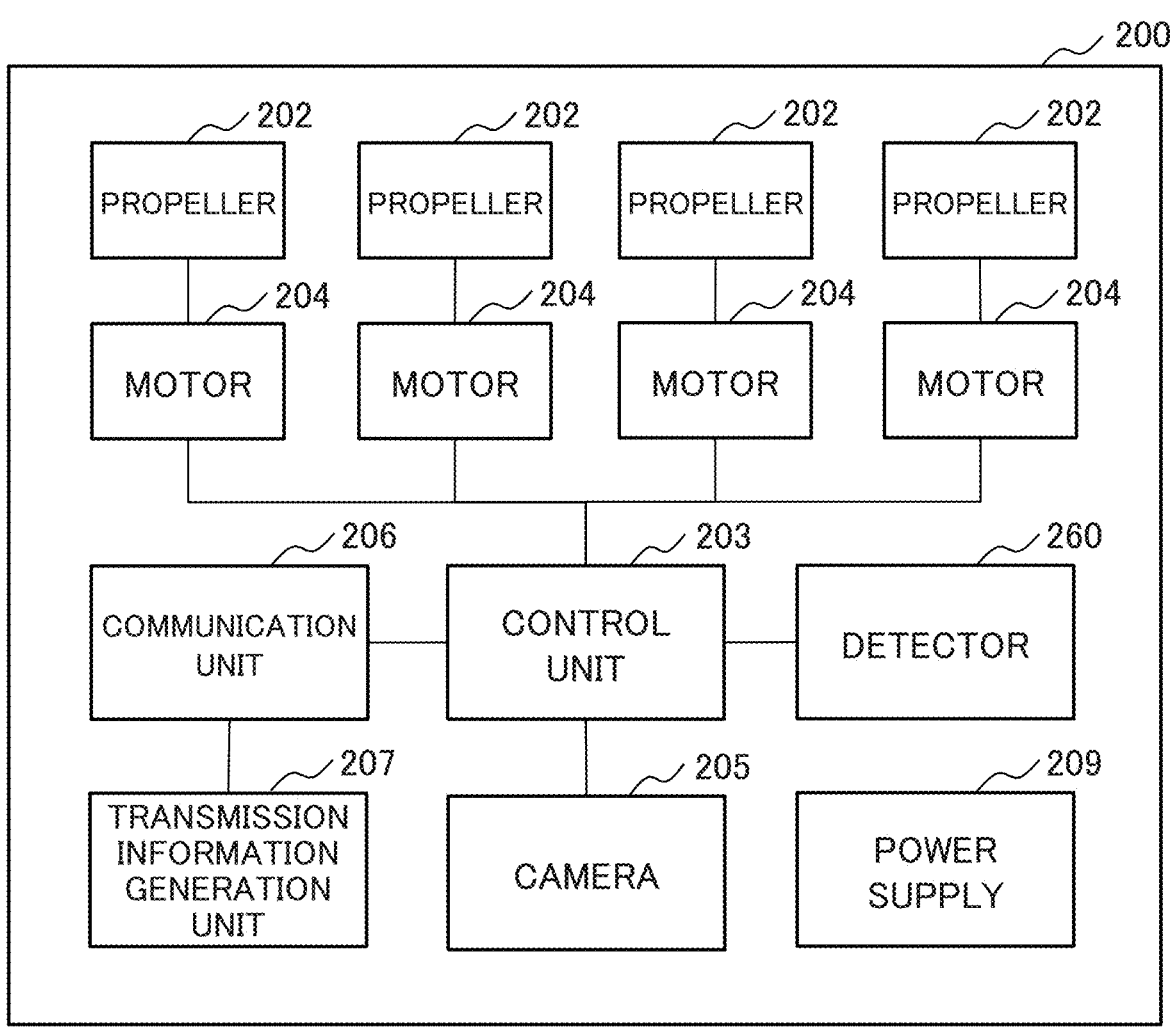
FIG. 16 is a block diagram illustrating an example of a configuration of a drone that uses a transport path to be managed by the management device according to the second example embodiment.
Figure 17:
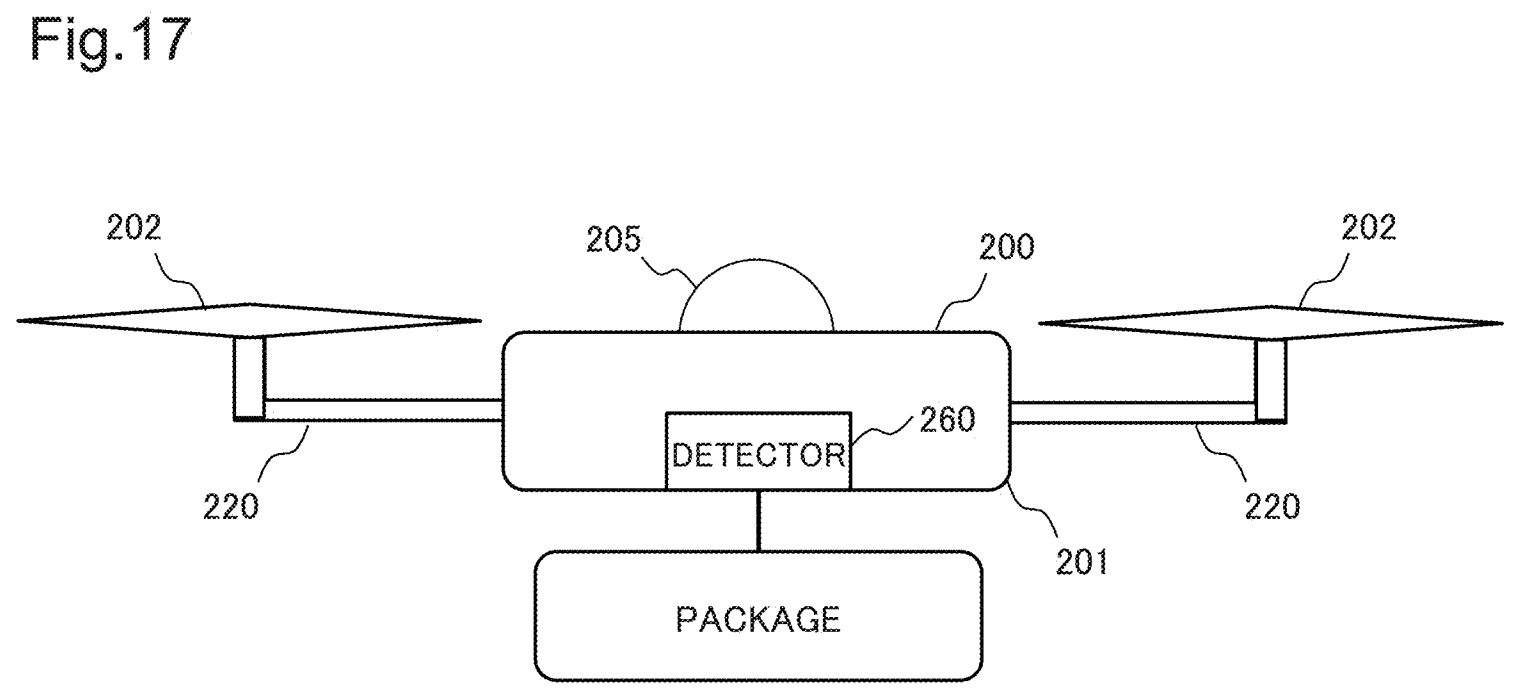

Next, an example of a drone that uses a transport path will be described with reference to the drawings. FIGS. 16 and 17 are conceptual diagrams illustrating an example of a configuration of a drone 200 using a transport path. FIG. 16 is a block diagram for explaining a functional configuration of the drone 200. FIG. 17 is a side view illustrating a state in which a package is mounted on the drone 200. A top view, a rear view, a bottom view, a slope view, and the like of the drone 200 are omitted. For example, the drone 200 is equipped with a remote identification (RID) device that transmits transmission information including a registration number, a manufacturing number, position information, time, and authentication information.

The drone 200 includes a main body 201, a propeller 202, a control unit 203, a motor 204, a camera 205, a communication unit 206, a transmission information generation unit 207, a power supply 209, and a detector 260. The control unit 203, the communication unit 206, the transmission information generation unit 207, and the power supply 209 are stored inside the main body 201. Most of the camera 205 except for the lens is stored inside the main body 201. FIG. 17 illustrates an example in which the lens of the camera 205 protrudes above the drone 200. The detector 260 may be mounted inside the drone 200 or may be externally attached to the outside of the drone 200. The drone 200 has a package carrying function. FIG. 17 illustrates an example in which a package is suspended below the drone 200. For example, the drone 200 may carry a package by storing the package inside the main body 201 or placing the package on the main body 201. In a case where a package is placed on the upper portion of the main body 201, the camera 205 may be detached from the main body 201 so that the camera 205 can be attached above or around the package.

The main body 201 has a configuration similar to that of the main body 101 of the first example embodiment. The main body 201 is a housing that stores the control unit 203, the camera 205, the communication unit 206, the transmission information generation unit 207, the power supply 209, the detector 260, and the like. At least one propeller 202 for causing the drone 200 to fly is attached to the main body 201. For example, the main body 201 is provided with a space for storing a package therein, a mechanism for hanging down a package, a place for placing a package thereon, and the like depending on the application. For example, the main body 201 may have a hole for the detector 260 to detect the package. The shape and material of the main body 201 are not particularly limited.

The propeller 202 has a configuration similar to that of the propeller 102 of the first example embodiment. The propeller 202 is a mechanism that causes the drone 200 to fly. The propeller 202 is rotatably fixed to the main body 201 by an arm 220. The motor 204 for rotating the propeller 202 is installed in the propeller 202. The size and attachment position of the propeller 202 in FIG. 17 are not sufficiently designed for flying the drone 200, but are conceptual.

The motor 204 has a configuration similar to that of the motor 104 of the first example embodiment. The motor 204 is installed in each of the plurality of propellers 202. The motor 204 rotates the propeller 202 under the control of the control unit 203.

The detector 260 is a detection device that detects a package mounted on the drone 200. When a package is mounted on the drone 200, the detector 260 outputs a detection value 216 relevant to the mounted package to the control unit 203. The detection value 216 output to the control unit 203 is output to the communication unit 206 via the control unit 203. The detector 260 may be configured to output the detection value to the communication unit 206 without passing through the control unit 203.

For example, the detector 260 is implemented by an optical sensor or an acoustic sensor. The optical sensor detects an object in accordance with shielding of light due to mounting of a package. The acoustic sensor detects an object in accordance with reflection of sound due to mounting of a package. As long as the presence or absence of the package can be detected, the detector 260 is not limited to the optical sensor or the acoustic sensor. When detecting that the package is mounted, the detector 260 outputs the detection value 216 indicating that the package is mounted. For example, when detecting that the package is mounted, the detector 260 outputs a flag "1" indicating that the package is mounted as the detection value 216.

For example, the detector 260 is implemented by a sensor capable of measuring a weight such as a weight sensor. When a package is mounted, the detector 260 measures the weight of the mounted package. The detector 260 outputs the measured weight of the package as the detection value 216.

For example, the detector 260 is implemented by a code reader or a camera capable of detecting a two-dimensional code (identification code) such as a barcode or a quick response (QR) code (registered trademark). For example, the identification code may be an array of symbols such as characters and numbers. When a package is mounted, the detector 260 reads the identification code of the mounted package. The detector 260 outputs the read identification code as the detection value 216.

The control unit 203 has a configuration similar to that of the control unit 103 of the first example embodiment. The control unit 203 is a control device that controls the drone 200. For example, the control unit 203 is implemented by a control device such as a microcomputer and a microcontroller.

The control unit 203 controls imaging of the camera 205. The control unit 203 causes the camera 205 to capture an image at a predetermined timing. The control unit 203 acquires an image captured by the camera 205. In the case of providing an image to the management side of the transport path, the control unit 203 outputs the acquired image to the communication unit 206.

The control unit 203 controls the rotation of the propeller 202. The control unit 203 controls the rotation speed of each propeller 202 by driving and controlling the motor 204 of each propeller 202. While the drone 200 is navigating inside the transport path, the control unit 203 controls the rotation of the propeller 202 based on the position of the guide light included in the image captured by the camera 205. The control unit 203 controls the rotation of the propeller 202 so that the drone 200 navigates the transport path according to the position of the guide light lit in the color to be referred to.

The control unit 203 acquires the detection value 216 from the detector 260. The control unit 203 outputs the acquired detection value 216 to the communication unit 206. The control unit 203 may detect that a package is mounted on the drone 200 according to the detection value 216. For example, the control unit 203 may be configured to depart toward the transport path after detecting that the package is mounted. With such a configuration, it is possible to prevent the drone 200 from departing in a state where the package to be transported is not mounted. For example, the control unit 203 may be configured to transmit an emergency signal to the management device 20 (management side) in a case where it is desired to detect a package while using the transport path. With such a configuration, the management device 20 (management side) can recognize that the package being transported has been detached from the drone 200.

The camera 205 has a configuration similar to that of the camera 105 of the first example embodiment. The camera 205 is disposed to photograph the periphery of the drone 200. The camera 205 captures an image around the drone 200. The camera 205 captures an image under the control of the control unit 203. The camera 205 outputs the captured image data (also referred to as an image) to the control unit 203.

The transmission information generation unit 207 has a configuration similar to that of the transmission information generation unit 107 according to the first example embodiment. The transmission information generation unit 207 generates transmission information unique to the drone 200. The transmission information generation unit 207 outputs the generated transmission information to the communication unit 206.

The communication unit 206 receives a radio signal transmitted from the management side. The communication unit 206 acquires transmission information generated by the transmission information generation unit 207 and an image captured by the camera 205. The communication unit 206 transmits a signal including transmission information and an image. Furthermore, the communication unit 206 acquires the detection value 216 detected by the detector 260. The communication unit 206 transmits a signal including the detection value 216. A signal transmitted from the communication unit 206 is received by the management device 20.

The power supply 209 has a configuration similar to that of the power supply 109 of the first example embodiment. The power supply 209 is a general secondary battery having a charging function. The power supply 209 is a power source of the drone 200.

(Operation)

Next, an example of the operation of the management device 20 forming the transport path and the operation of the drone 200 using the transport path will be described with reference to the drawings. Hereinafter, the operations of the management device 20 and the drone 200 will be described using a flowchart. Regarding the operation of the drone 200, the operation of the control unit 203 included in the drone 200 will be described.

[Management Device]

Figure 18:
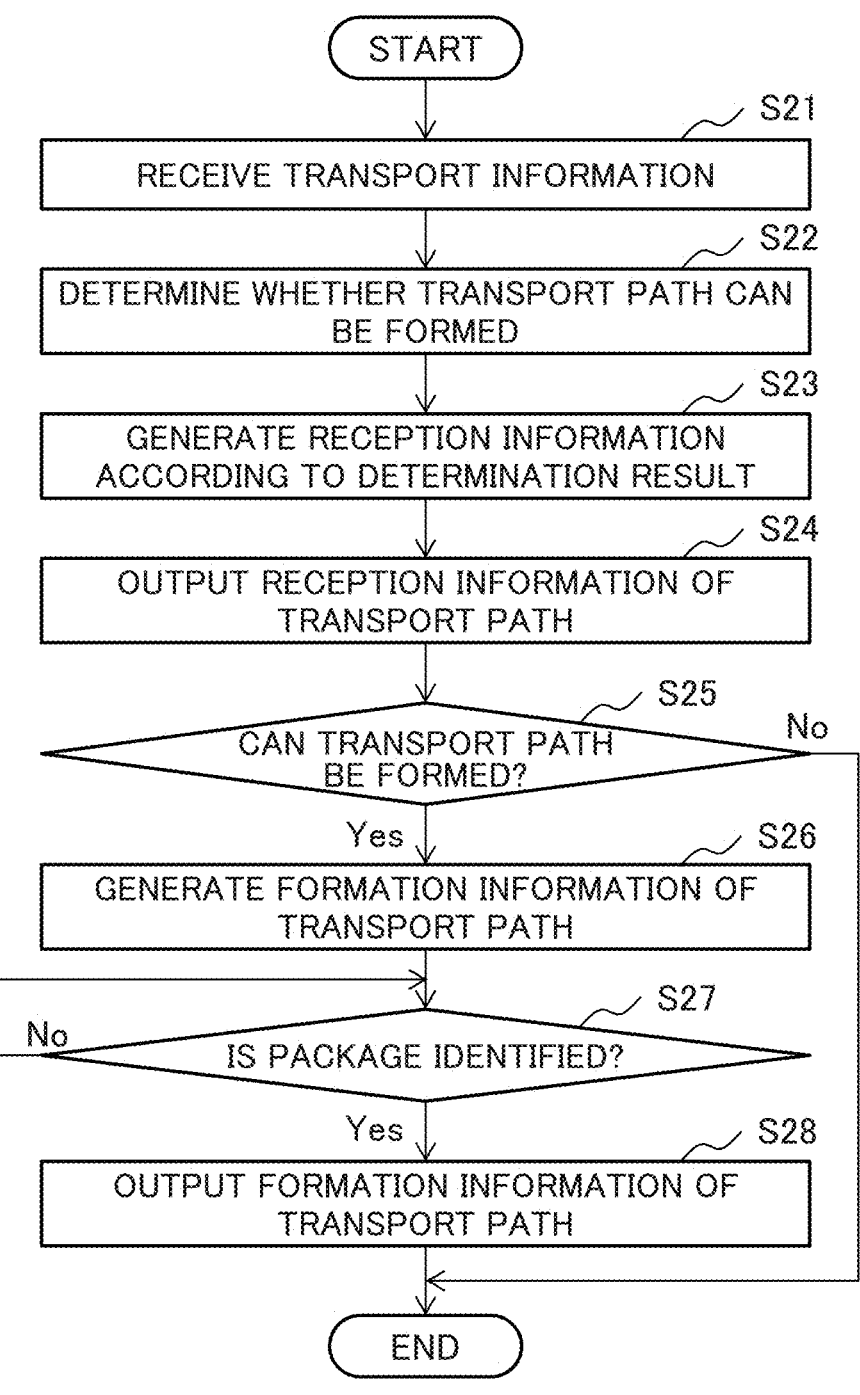
FIG. 18 is a flowchart for explaining an example of an operation of the management device according to the second example embodiment.

FIG. 18 is a flowchart for explaining an example of the operation of the management device 20. In the description along the flowchart of FIG. 18, the management device 20 will be described as an operation subject.

In FIG. 18, first, the management device 20 receives transport information 211 from a requesting party who requests transporting of a package using a transport path (step S21).

Next, the management device 20 determines whether the transport path can be formed according to the received transport information 211 (step S22).

Next, the management device 20 generates the reception information 215 according to the determination result (step S23). In a case where the transport path can be formed, the management device 20 generates reception information 215 indicating that the transport information 211 has been received. On the other hand, in a case where the transport path cannot be formed, the management device 20 generates reception information 215 indicating that the transport information 211 has not been received.

Next, the management device 20 outputs the generated reception information 215 to the requesting party of the transport information 211 (step S24). The user who is the requesting party who has browsed the reception information 215 can take an action according to the reception information 215. For example, in a case where the transport path can be formed, the user who is the requesting party mounts the package to be transported on the drone 200. For example, in a case where the transport path cannot be formed, the user who is the requesting party transports the package to be transported by means that does not use the transport path.

Next, in a case where the transport path can be formed (Yes in step S25), the management device 20 generates the formation information of the transport path (step S26). On the other hand, in a case where the transport path cannot be formed (No in step S25), the process according to the flowchart of FIG. 18 is ended.

When the detection value 216 is received and the package is identified (Yes in step S27), the management device 20 outputs formation information 213 of the transport path to the guide light installed on the transport path relevant to the transport information 211 (step S28). By turning on the guide light according to the formation information 213, a transport path according to the transport information 211 is formed. In a case where the detection value 216 is not received (No in step S27), the management device 20 waits until the detection value 216 is received. For example, as a result of receiving the detection value 216, there is a case where the package mounted on the drone 200 is different from the transport target. In such a case, the management device 20 may be configured to notify the requesting party to mount an appropriate package on the drone 200.

[Drone]

Figure 19:
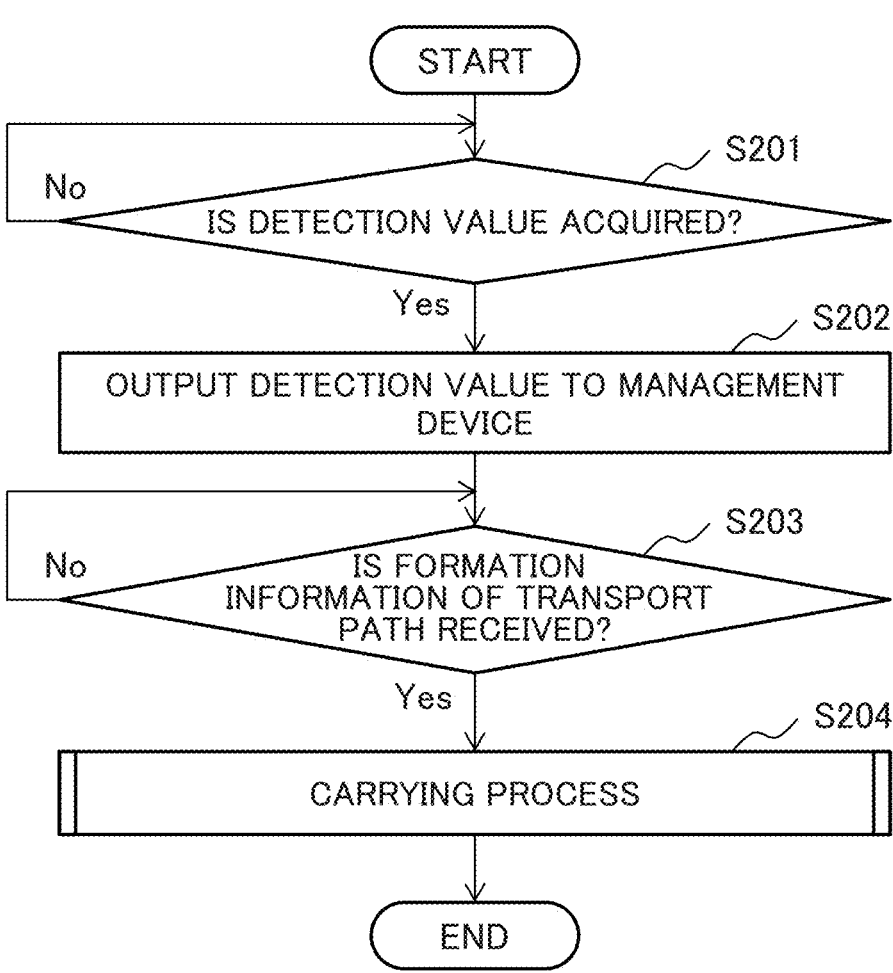
FIG. 19 is a flowchart for explaining an example of an operation of a drone that uses a transport path to be managed by the management device according to the second example embodiment.

FIG. 19 is a flowchart for explaining an example of the operation of the control unit 203 included in the drone 200. In the description along the flowchart of FIG. 19, the control unit 203 will be described as an operation subject.

In FIG. 19, when acquiring the detection value 216 by the detector 260 (Yes in step S201), the control unit 203 outputs the detection value 216 of the management device 20 (step S202). In a case where the detection value 216 by the detector 260 has not been acquired, the management device 20 waits until the detection value 216 is acquired.

When the formation information 213 of the transport path is acquired after step S203, the control unit 203 executes the carrying process (step S204). The carrying process in step S204 is the process in FIG. 14 of the first example embodiment. In a case where the formation information 213 of the transport path has not been acquired (No in step S203), the management device 20 waits until the formation information 213 is acquired.

As described above, the management device according to the present example embodiment includes the reception unit, the determination unit, the reception information output unit, the identification unit, the transport path formation unit, and the formation information output unit. The reception unit receives transport information relevant to the application for use of the aerial transport path formed indoors. The determination unit determines whether the aerial transport path can be formed according to the transport information. The reception information output unit outputs reception information including a determination result regarding whether the aerial transport path can be formed to a requesting party of the transport information. The identification unit acquires the detection value detected by the detector detected by the drone using the aerial transport path to be managed. The identification unit identifies that the package to be transported is mounted on the drone according to the acquired detection value. The identification unit outputs a package mounting notification notifying that a package to be transported is mounted on the drone. The transport path formation unit generates formation information of the aerial transport path according to the determination result that the aerial transport path can be formed. The transport path formation unit outputs formation information of the aerial transport path according to the package mounting notification output from the identification unit. The formation information output unit outputs formation information of the aerial transport path to a guide light installed indoors to form the aerial transport path.

In the present example embodiment, the formation information of the aerial transport path is output in response to the identification that the package is mounted on the drone using the aerial transport path. Therefore, according to the present example embodiment, the aerial transport path used by the drone to transport the package can be formed indoors at an appropriate timing.

Third Example Embodiment

Next, a management device according to a third example embodiment will be described with reference to the drawings. In the present example embodiment, whether the transport path can be formed is determined according to the authentication result of the requesting party included in the transport information.
(Configuration)

Figure 20:
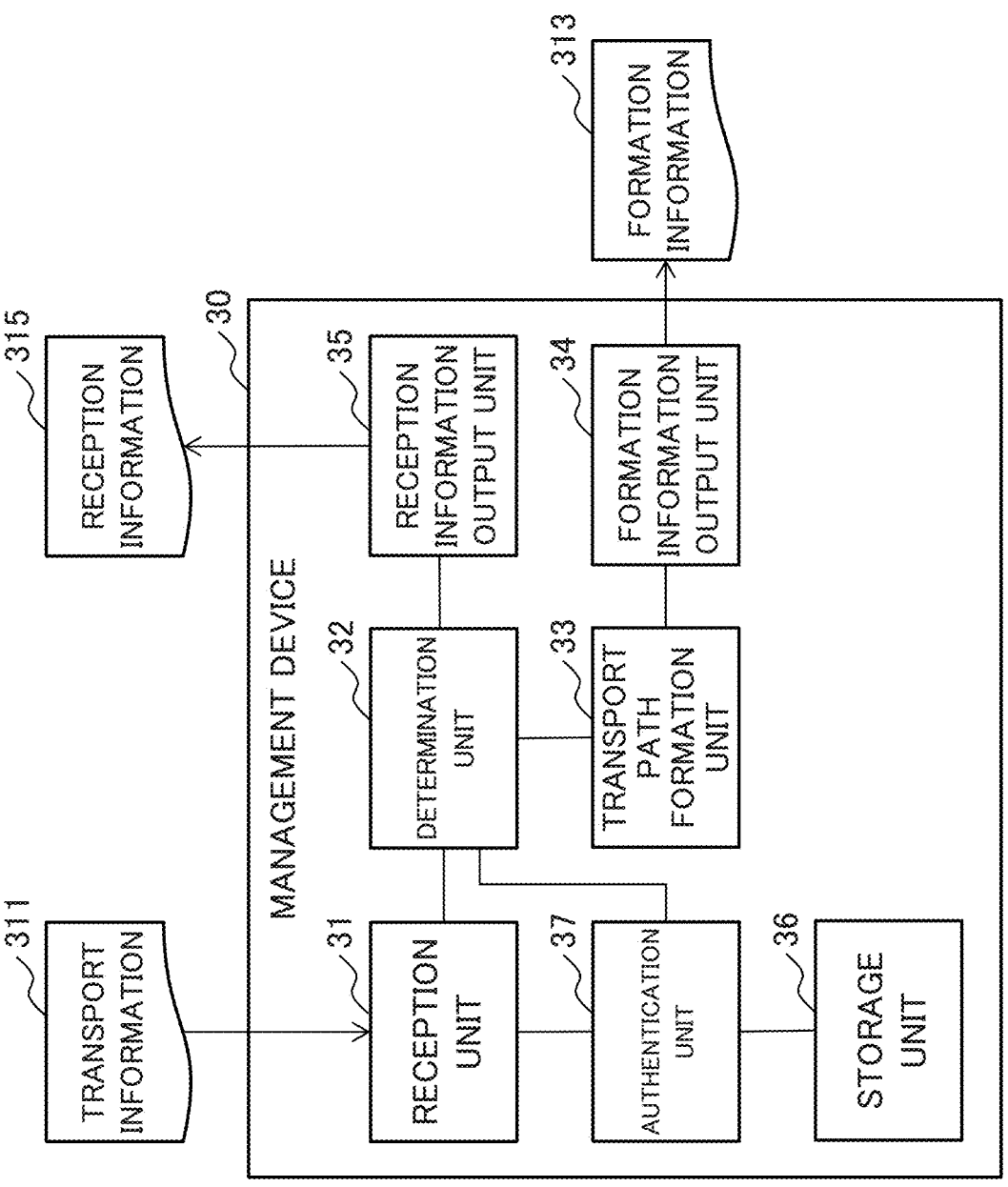
FIG. 20 is a block diagram illustrating an example of a configuration of a management device according to a third example embodiment.

FIG. 20 is a block diagram illustrating an example of a configuration of a management device 30 according to the present example embodiment. The management device 30 includes a reception unit 31, a determination unit 32, a transport path formation unit 33, a formation information output unit 34, a reception information output unit 35, a storage unit 36, and an authentication unit 37.

The reception unit 31 has a configuration similar to that of the reception unit 11 according to the first example embodiment. The reception unit 31 receives transport information 311 relevant to an application for use of the transport path formed indoors. The transport information 311 includes a requesting party code as in the transport information 111 (FIG. 2) described in the first example embodiment. The transport information 311 is input via a terminal device (not illustrated). The reception unit 31 outputs the received transport information 311 to the determination unit 32 and the authentication unit 37.

In the storage unit 36, the user code of the user whose use of the transport path has been registered is registered. The user whose user code is registered in the storage unit 36 can use the service using the transport path.

The authentication unit 37 acquires the transport information 311 from the reception unit 31. The authentication unit 37 verifies whether the user code matching the requesting party code included in the acquired transport information 311 is registered in a storage unit 38. In a case where the user code matching the requesting party code included in the transport information 311 is registered in the storage unit 38, the authentication unit 37 outputs an authentication result indicating that the requesting party is authenticated to the determination unit 32. On the other hand, in a case where the user code matching the requesting party code included in the transport information 311 is not registered in the storage unit 38, the authentication unit 37 outputs an authentication result indicating that the requesting party is not authenticated to the determination unit 32.

The determination unit 32 has a configuration similar to that of the determination unit 12 according to the first example embodiment. The determination unit 32 acquires the transport information 311 from the reception unit 31. The determination unit 32 acquires an authentication result from the authentication unit 37. The determination unit 32 determines whether the transport path can be formed according to the authentication result of the authentication unit 37 and the transport information 311. In a case where the authentication result indicating that the requesting party is authenticated is acquired, the determination unit 32 determines whether the transport path can be formed according to the transport information 311. In any case where it is possible/impossible to form the transport path, the determination unit 32 outputs reception information 315 including the determination result of whether the transport path can be formed to the reception information output unit 35. When the transport path can be formed, the determination unit 32 outputs a formation instruction of the transport path to the transport path formation unit 33. The formation instruction of the transport path includes a start point and an end point of the transport path. On the other hand, in the case of acquiring an authentication result indicating that the requesting party is not authenticated, the determination unit 32 outputs reception information 315 including a determination result indicating that the requesting party is not authenticated to the reception information output unit 35.

The reception information output unit 35 has a configuration similar to that of the reception information output unit 15 of the first example embodiment. The reception information output unit 35 acquires, from the determination unit 32, the reception information 315 including a determination result as to whether the transport path can be formed. In a case where the requesting party is not authenticated, the reception information output unit 35 acquires reception information 315 including a determination result indicating that the requesting party is not authenticated from the determination unit 32. The reception information output unit 35 transmits the acquired reception information 315 to the terminal device used by the requesting party of the transport information 311.

FIG. 21 is an example of the reception information 315 including a determination result indicating that the requesting party is not authenticated. For example, the reception information 315 is displayed on a screen of a terminal device (not illustrated) browsable by the requesting party. The reception information 315 of FIG. 21 includes the determination result "The following requesting party code is not registered." Under the determination result, "Requesting Party Code: 123 . . . 321" that has not been authenticated is displayed. In the example of the reception information 315 of FIG. 21, two pieces of recommendation information are displayed to the requesting party who has not been authenticated. The first is recommendation information that "Check the requesting party code and apply again." The second is recommendation information that "If the use of the transport path has not been registered, please register the use." The requesting party who has confirmed the recommendation information can use the transport path by taking an action according to the recommendation information.

The transport path formation unit 33 has a configuration similar to that of the transport path formation unit 13 according to the first example embodiment. The transport path formation unit 33 acquires the transport path formation instruction from the determination unit 32. The transport path formation unit 33 generates formation information of the transport path in response to the transport path formation instruction. The transport path formation unit 33 generates formation information for forming a transport path between a start point and an end point included in the transport path formation instruction. The formation information includes a start point, a route, and an end point of the transport path. The transport path formation unit 33 outputs the generated formation information to the formation information output unit 34.

The formation information output unit 34 has a configuration similar to that of the formation information output unit 14 of the first example embodiment. The formation information output unit 34 acquires the formation information from the transport path formation unit 33. The formation information output unit 34 outputs the acquired formation information to the guide light located on the route on which the transport path is formed. The guide light that has acquired the formation information is lit according to the formation information.

(Operation)

Figure 22:
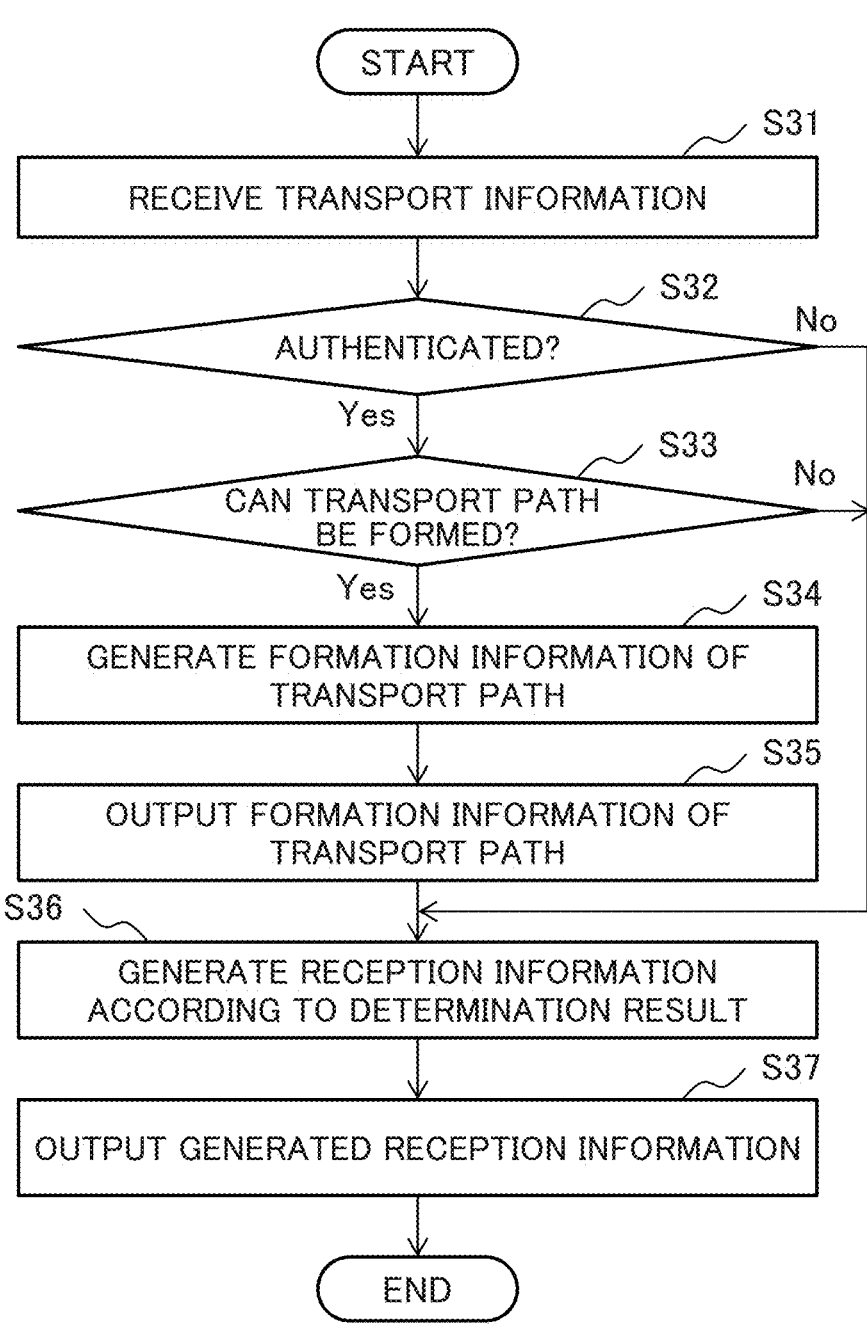
FIG. 22 is a flowchart for explaining an example of an operation of the management device according to the third example embodiment.

Next, an example of an operation of the management device 30 forming the transport path will be described with reference to the drawings. FIG. 22 is a flowchart for explaining an example of the operation of the management device 30. In the description along the flowchart of FIG. 22, the management device 30 will be described as an operation subject.

In FIG. 22, first, the management device 30 receives transport information 311 from a requesting party who requests transporting of a package using a transport path (step S31).

Next, the management device 30 authenticates the requesting party according to the requesting party code included in the transport information 311 (step S32). In a case where the requesting party is authenticated (Yes in step S32), the management device 30 determines whether the transport path can be formed according to the transport information 311 (step S33). On the other hand, in a case where the requesting party is not authenticated (No in step S32), the process proceeds to step S36.

In step S33, in a case where the transport path can be formed (Yes in step S33), the management device 30 generates the formation information of the transport path (step S34). On the other hand, in a case where the transport path cannot be formed (No in step S33), the process proceeds to step S36.

After step S34, the management device 30 outputs formation information 313 of the transport path to the guide light installed on the transport path relevant to the transport information 311 (step S35). By turning on the guide light according to the formation information 313, a transport path according to the transport information 311 is formed.

After step S35, in the case of No in step S32, or in the case of No in step S33, the management device 30 generates the reception information 315 according to the determination result (step S35). In a case subsequent to step S35, the management device 30 generates reception information 315 indicating that the transport information 311 has been received. In the case of No in step S33, the management device 30 generates reception information 315 indicating that the transport information 311 has not been received. In the case of No in step S32, the management device 30 generates the reception information 315 indicating that the requesting party code is not authenticated.

Next, the management device 30 outputs the generated reception information 315 to the requesting party of the transport information 311 (step S37). The user who is the requesting party who has browsed the reception information 315 can take an action according to the reception information 315. For example, in a case where the transport path is formed, the user who is the requesting party mounts a package to be transported on the drone by a designated time. For example, in a case where the transport path is not formed, the user who is the requesting party transports the package to be transported by means that does not use the transport path. For example, in a case where the requesting party code is not authenticated, the user who is the requesting party checks the requesting party code again or registers the requesting party code.

The order of generation/output of the formation information of the transport path and generation/output of the reception information may be switched. For example, steps S36 to S37 may be executed before steps S34 to S35. Steps S34 to S35 and steps S36 to S37 may be performed in parallel.

As described above, the management device according to the present example embodiment includes the reception unit, the storage unit, the authentication unit, the determination unit, the reception information output unit, the transport path formation unit, and the formation information output unit. The reception unit receives transport information relevant to the application for use of the aerial transport path formed indoors. The reception unit receives transport information including a requesting party code indicating a requesting party of a package to be transported. The storage unit stores the user code of the user who has registered the use of the aerial transport path. The authentication unit authenticates the requesting party of the transport information according to matching between the requesting party code included in the transport information and the user code stored in the storage unit. The determination unit determines whether the aerial transport path can be formed according to the transport information authenticated by the authentication unit. The reception information output unit outputs reception information including a determination result regarding whether the aerial transport path can be formed to a requesting party of the transport information. The transport path formation unit generates formation information of the aerial transport path according to the determination result that the aerial transport path can be formed. The formation information output unit outputs formation information of the aerial transport path to a guide light installed indoors to form the aerial transport path.

In the present example embodiment, the formation information of the aerial transport path is output according to the authentication of the requesting party of the transport information. Therefore, according to the present example embodiment, it is possible to form the aerial transport path used by the drone to transport the package indoors in response to a request from an appropriate requesting party.

Fourth Example Embodiment

Next, a management device according to a fourth example embodiment will be described with reference to the drawings. In the present example embodiment, the requesting party is charged according to the use of the transport path.

(Configuration)

Figure 23:
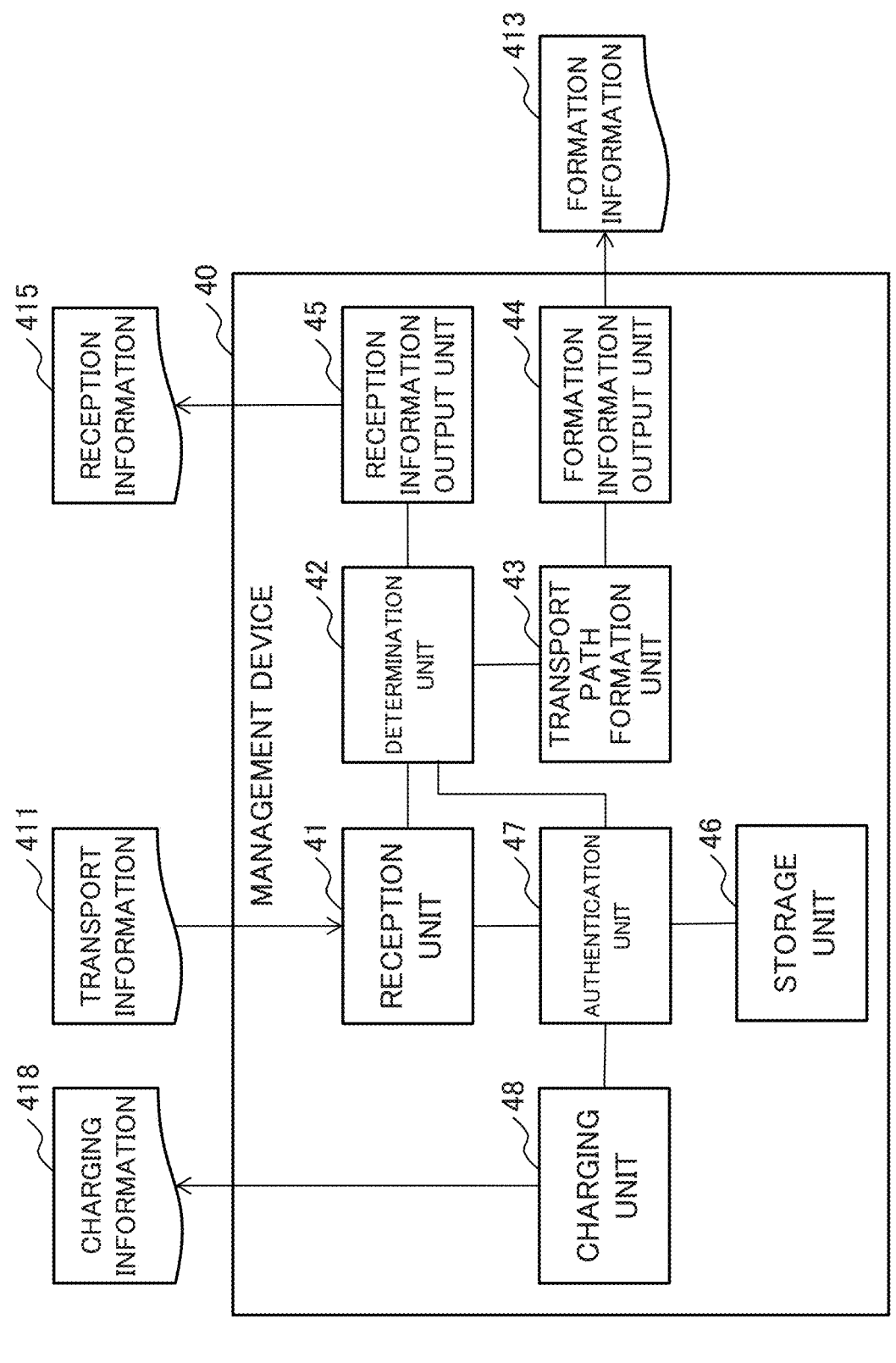
FIG. 23 is a block diagram illustrating an example of a configuration of a management device according to a fourth example embodiment.

FIG. 23 is a block diagram illustrating an example of a configuration of a management device 40 according to the present example embodiment. The management device 40 includes a reception unit 41, a determination unit 42, a transport path formation unit 43, a formation information output unit 44, a reception information output unit 45, a storage unit 46, an authentication unit 47, and a charging unit 48.

The reception unit 41 has a configuration similar to that of the reception unit 11 according to the first example embodiment. The reception unit 41 receives transport information 411 relevant to an application for use of the transport path formed indoors. The transport information 411 includes a requesting party code as in the transport information 111 (FIG. 2) described in the first example embodiment. The transport information 411 is input via a terminal device (not illustrated). The reception unit 41 outputs the received transport information 411 to the determination unit 42 and the authentication unit 47.

In the storage unit 46, the user code of the user whose use of the transport path has been registered is registered. The user whose user code is registered in the storage unit 46 can use the service using the transport path. The user code is associated with a bank account of the user or account information of a settlement system such as a credit card or electronic money so that a charge for using a service using transport can be charged.

The authentication unit 47 acquires the transport information 411 from the reception unit 41. The authentication unit 47 verifies whether the user code matching the requesting party code included in the acquired transport information 411 is registered in the storage unit 46. In a case where the user code matching the requesting party code included in the transport information 411 is registered in the storage unit 46, the authentication unit 47 outputs an authentication result indicating that the requesting party is authenticated to the determination unit 42. On the other hand, in a case where the user code matching the requesting party code included in the transport information 411 is not registered in the storage unit 46, the authentication unit 47 outputs an authentication result indicating that the requesting party is not authenticated to the determination unit 42.

The determination unit 42 has a configuration similar to that of the determination unit 12 according to the first example embodiment. The determination unit 42 acquires the transport information 411 from the reception unit 41. The determination unit 42 acquires an authentication result from the authentication unit 47. The determination unit 42 determines whether the transport path can be formed according to the authentication result of the authentication unit 47 and the transport information 411. In a case where the authentication result indicating that the requesting party is authenticated is acquired, the determination unit 42 determines whether the transport path can be formed according to the transport information 411. In any case where it is possible/impossible to form the transport path, the determination unit 42 outputs reception information 415 including the determination result of whether the transport path can be formed to the reception information output unit 45. When the transport path can be formed, the determination unit 42 outputs a formation instruction of the transport path to the transport path formation unit 43. The formation instruction of the transport path includes a start point and an end point of the transport path. The determination unit 42 outputs a charging instruction relevant to the formed transport path to the authentication unit 47. For example, the charging instruction includes a determination result that the transport path is formed, and information such as a start point and an end point of the transport path. On the other hand, in the case of acquiring an authentication result indicating that the requesting party is not authenticated, the determination unit 42 outputs reception information 415 including a determination result indicating that the requesting party is not authenticated to the reception information output unit 45.

The reception information output unit 45 has a configuration similar to that of the reception information output unit 15 of the first example embodiment. The reception information output unit 45 acquires, from the determination unit 42, the reception information 415 including a determination result as to whether the transport path can be formed. In a case where the requesting party is not authenticated, the reception information output unit 45 acquires reception information 415 including a determination result indicating that the requesting party is not authenticated from the determination unit 42. The reception information output unit 45 transmits the acquired reception information 415 to the terminal device used by the requesting party of the transport information 411.

The authentication unit 47 acquires the charging instruction from the determination unit 42. The authentication unit 47 generates charging information 418 for the requesting party of the acquired charging instruction. The authentication unit 47 generates the charging information 418 including the usage fee (charged amount) of the transport path. The usage fee of the transport path may be set based on a preset contract condition or the like. For example, the authentication unit 47 generates the charging information 418 including the usage fee of the transport path relevant to the usage distance of the transport path based on the start point and the end point of the transport path included in the charging instruction. The authentication unit 47 outputs the generated charging information 418 to the charging unit 48 in association with the account information of the requesting party.

The charging unit 48 acquires the charging information 418 associated with the account information of the requesting party from the authentication unit 47. The charging unit 48 charges the usage fee included in the acquired charging information 418 to the billing destination according to the account information associated with the charging information 418. The charging method by the charging unit 48 is not particularly limited.

The transport path formation unit 43 has a configuration similar to that of the transport path formation unit 13 according to the first example embodiment. The transport path formation unit 43 acquires the transport path formation instruction from the determination unit 42. The transport path formation unit 43 generates formation information of the transport path in response to the transport path formation instruction. The transport path formation unit 43 generates formation information for forming a transport path between a start point and an end point included in the transport path formation instruction. The formation information includes a start point, a route, and an end point of the transport path. For example, the transport path formation unit 43 may be configured to form the transport path with the input of the usage fee to the designated account as a start point according to the charging by the charging unit 48. The transport path formation unit 43 outputs the generated formation information to the formation information output unit 44.

The formation information output unit 44 has a configuration similar to that of the formation information output unit 14 of the first example embodiment. The formation information output unit 44 acquires the formation information from the transport path formation unit 43. The formation information output unit 44 outputs the acquired formation information to the guide light located on the route on which the transport path is formed. The guide light that has acquired the formation information is lit according to the formation information.
(Operation)

Figure 24:
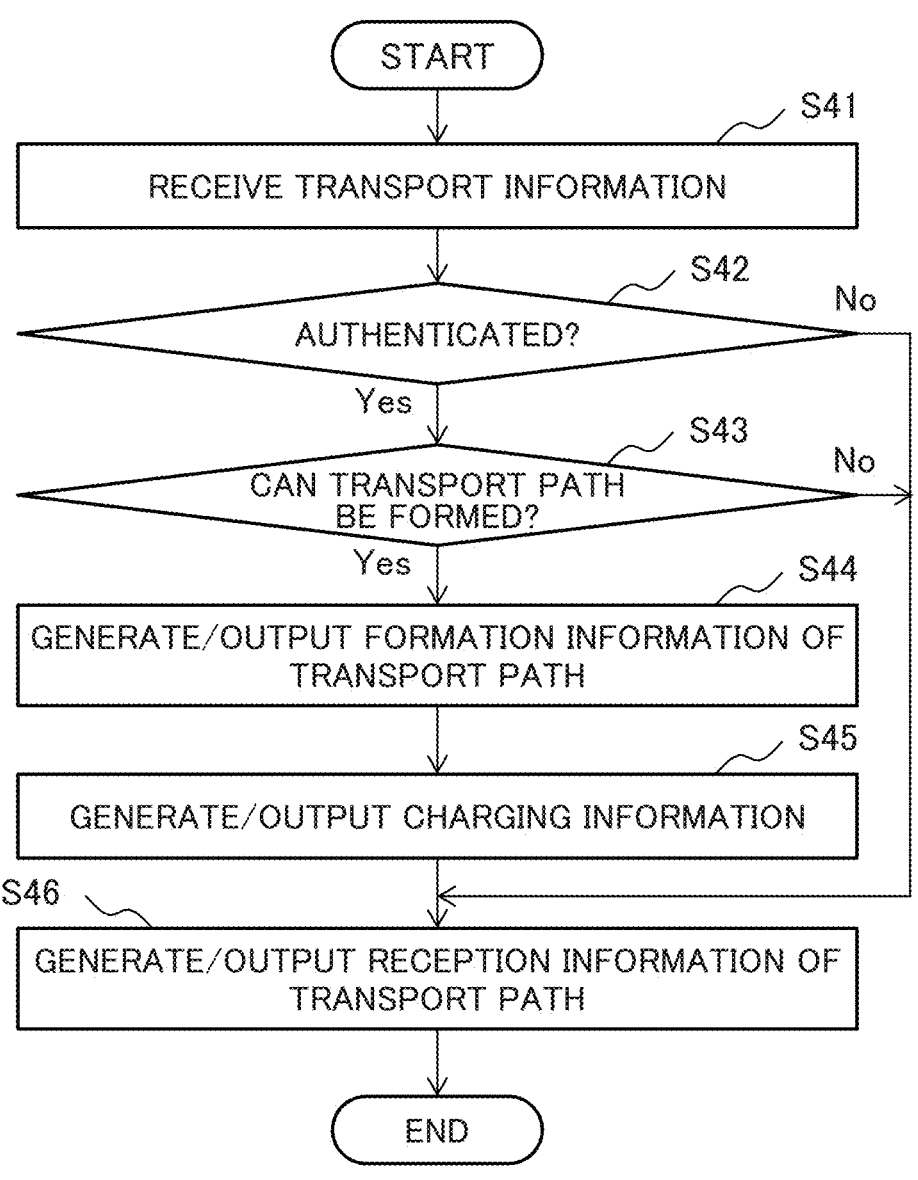
FIG. 24 is a flowchart for explaining an example of an operation of the management device according to the fourth example embodiment.

Next, an example of an operation of the management device 40 forming the transport path will be described with reference to the drawings. FIG. 24 is a flowchart for explaining an example of the operation of the management device 40. In the description along the flowchart of FIG. 24, the management device 40 will be described as an operation subject.

In FIG. 24, first, the management device 40 receives transport information 411 from a requesting party who requests transporting of a package using a transport path (step S41).

Next, the management device 40 authenticates the requesting party according to the requesting party code included in the transport information 411 (step S42). In a case where the requesting party is authenticated (Yes in step S42), the management device 40 determines whether the transport path can be formed according to the transport information 411 (step S43). On the other hand, in a case where the requesting party is not authenticated (No in step S42), the process proceeds to step S46.

In step S43, in a case where the transport path can be formed (Yes in step S43), the management device 40 generates/outputs the formation information of the transport path (step S44). The management device 40 outputs formation information 413 of the transport path to the guide light installed on the transport path relevant to the transport information 411. By turning on the guide light according to the formation information 413, a transport path according to the transport information 411 is formed. On the other hand, in a case where the transport path cannot be formed (No in step S43), the process proceeds to step S46.

Next, the management device 40 generates/outputs the charging information 418 relevant to the use of the transport path (step S45). The management device 40 charges the charging information 418 relevant to the use of the transport path to the account of the requesting party of the transport information 411.

After step S45, in the case of No in step S42, or in the case of No in step S43, the management device 40 generates/outputs the reception information 415 according to the determination result (step S46). In a case subsequent to step S45, the management device 40 generates reception information 415 indicating that the transport information 411 has been received. In the case of No in step S43, the management device 40 generates reception information 415 indicating that the transport information 411 has not been received. In the case of No in step S42, the management device 30 generates the reception information 415 indicating that the requesting party code is not authenticated.

Next, the management device 40 outputs the generated reception information 415 to the requesting party of the transport information 411 (step S46). The user who is the requesting party who has browsed the reception information 415 can take an action according to the reception information 415. For example, in a case where the transport path is formed, the user who is the requesting party mounts a package to be transported on the drone by a designated time. For example, in a case where the transport path is not formed, the user who is the requesting party transports the package to be transported by means that does not use the transport path. For example, in a case where the requesting party code is not authenticated, the user who is the requesting party checks the requesting party code again or registers the requesting party code.

The order of generation/output of the formation information of the transport path (step S44), generation/output of the charging information (step S45), and generation/output of the reception information (step S46) may be changed. For example, step S46 may be executed before step S44 or step S45. For example, step S44 may be performed after step S45 so that the transport path is formed after charging. Step S44, step S45, and step S46 may be performed in parallel.

Application Example 1

Next, Application Example 1 of the management device 40 of the present example embodiment will be described with reference to the drawings. The present application example is an example in which a requesting party in an office requests a store outside an office building in which the office resides to carry a package.

FIG. 25 illustrates an example of the transport information 411 received by the management device 40 in the present application example. The transport information 411 of FIG. 25 is an application for use of a transport path for product purchase from a requesting party in the office A to a store (convenience store S) outside the office building in which the office A resides. The transport information 411 of FIG. 25 includes a requesting party code, a request destination, a transport source, a transport destination, and a product. The requesting party code (also referred to as a user code) is a user identifier (ID) of the requesting party, and an identification symbol capable of identifying an individual, such as a registration number, an employee number, and a name. In the case of the example of FIG. 25, the identification symbol "123 . . . 321" of the requesting party is written in the requesting party code. The request destination is a purchase destination of the product. In the case of the example of FIG. 25, the name of the "convenience store S" outside the office building is written in the request destination. The transport source is a departure point of the package to be transported. In the case of the example of FIG. 25, the "convenience store S" that is the transport source of the product is the transport source. The transport destination is a destination to which the product is transported. In the case of the example of FIG. 25, the place where the requesting party of the identification symbol "123 . . . 321" in the office A is located is the transport destination. The product is a product to be purchased. In the case of the example of FIG. 25, "sandwich" is a product. The transport information may include supplementary information other than a requesting party code, a request destination, a transport source, a transport destination, and a product. For example, the transport information may include supplementary information regarding a transport path desired to be used, a desired formation time of the transport path, and a product to be transported. The supplementary information included in the transport information is not limited.

FIG. 26 is an example of the charging information 418 relevant to the transport information 411. FIG. 26 illustrates the charging information 418 for the transport information 411 of FIG. 25. The charging information 418 of FIG. 26 includes information of "The charged amount is as follows." FIG. 26 also illustrates the transport information 411 of FIG. 25, but the transport information 411 may not be included in the charging information 418. The charging information 418 of FIG. 26 includes information regarding a charged amount saying "Charged Amount: 350 Yen (including delivery fee)." The charging information 418 of FIG. 26 includes information of "The charged amount will be withdrawn from the designated account (YYYY) on December XX."

Figure 27:
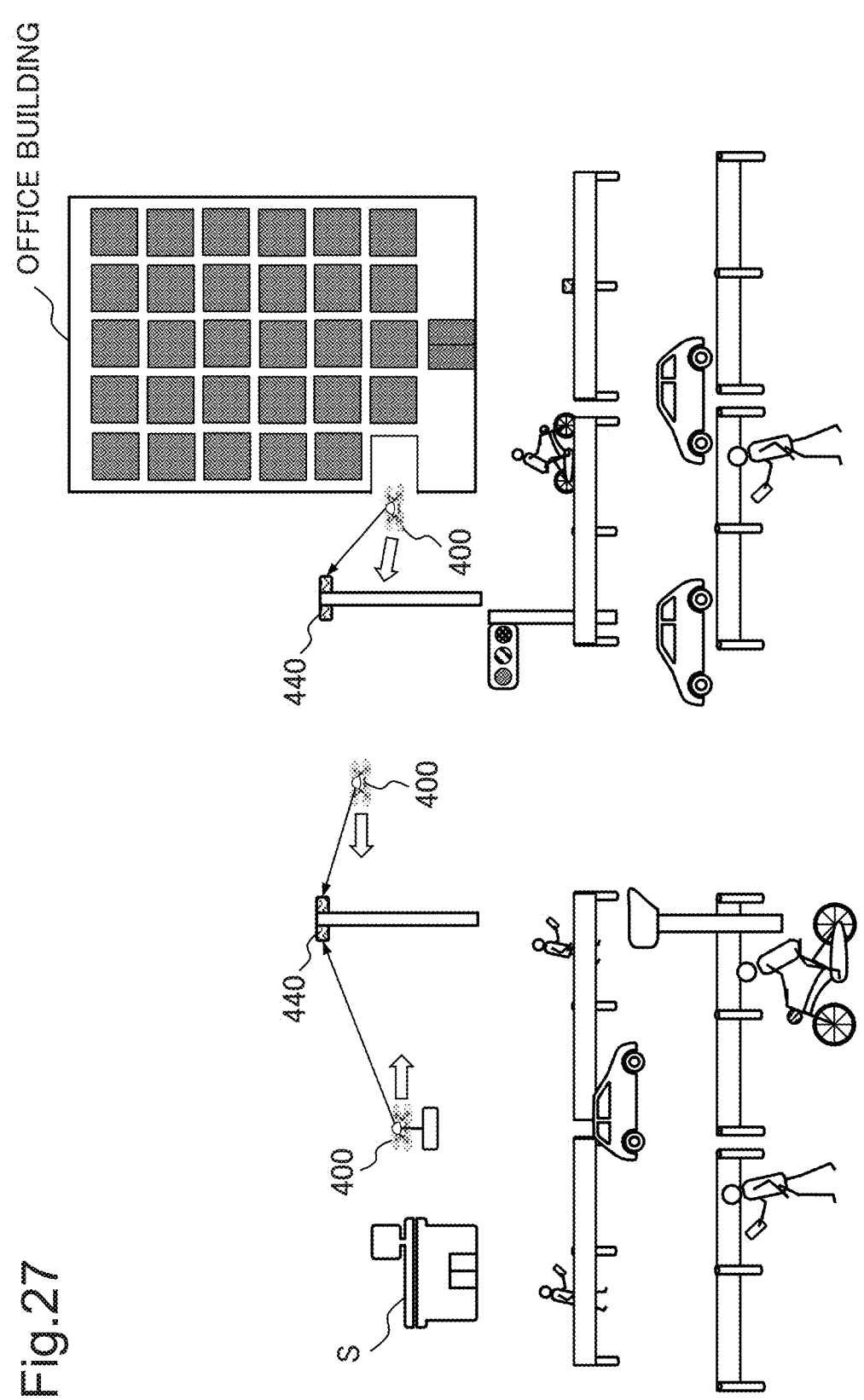
FIG. 27 is a conceptual diagram illustrating an example in which a drone transports a package using a transport path formed in Application Example 1 of the fourth example embodiment.

FIG. 27 is a conceptual diagram illustrating an example in which a transport path is formed between an office building in which the office A resides and the convenience store S. A guide light 440 is installed between the office building and the convenience store S. In the example of FIG. 27, a passage window of a drone 400 is formed in the office building. The drone 400 that has left the office building arrives at the convenience store S while referring to the guide light 440. A product relevant to the transport information 411 is mounted on the drone 400 that has arrived at the convenience store S. The drone 400 may be owned by the convenience store S. The drone 400 on which the product is mounted arrives at the office building while referring to the guide light 440. The drone 400 that has arrived at the office building moves toward the office A where the requesting party is located by using the transport path formed inside the office building.

As described above, in the present application example, the transport path is extended not only indoors such as an office building but also outdoors. Therefore, according to the present application example, it is possible to transport a package from an outdoor transport source to an indoor transport destination. For example, if the guide light 440 is installed above a utility pole, a traffic signal, or the like, smooth transporting of package can be implemented without being affected by traffic congestion or the like.

Application Example 2

Next, Application Example 2 of the management device 40 of the present example embodiment will be described with reference to the drawings. The present application example is an example in which a package is transported on a transport path formed inside a warehouse.

Figure 28:
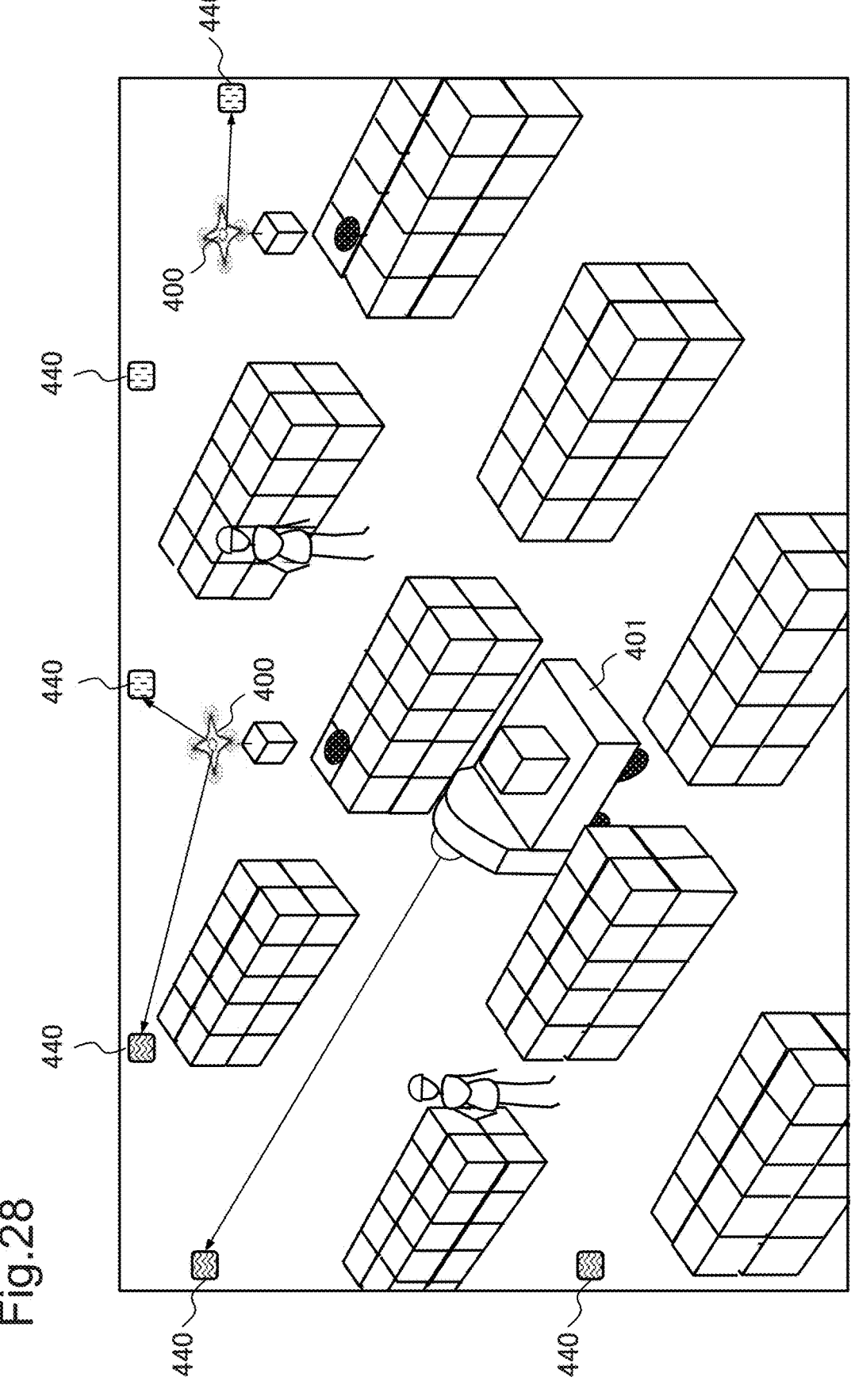
FIG. 28 is a conceptual diagram for explaining Application Example 2 of the fourth example embodiment.

FIG. 28 is a conceptual diagram for explaining the present application example. FIG. 28 is an example of forming a transport path using the guide light 440 installed inside a warehouse. For example, the guide light 440 is installed on a ceiling or a wall surface of the warehouse. The flying drone 400 moves in the warehouse while referring to the guide light 440. Since the flying drone 400 can move above the package, it can move in the warehouse even when there is no gap between the packages. FIG. 28 illustrates a taxiing drone 401. Since the taxiing drone 401 moves through a gap between packages, a degree of freedom of movement is smaller than that of the flying drone 400. However, the taxiing drone 401 can carry a larger package than the flying drone 400.

FIG. 28 illustrates an operation in a warehouse where a person can enter, but the present application example can also be operated in a warehouse where it is difficult for a person to enter. For example, the present application example can also be applied to an indoor space having a low oxygen concentration or a freezer for storing a frozen article according to a storage situation of a package. The present application example can also be applied to indoors with high temperature or indoors with high radiation concentration. The present application example can be applied to any application in which the drone 400 can move.

As described above, the management device according to the present example embodiment includes the reception unit, the storage unit, the authentication unit, the charging unit, the determination unit, the reception information output unit, the transport path formation unit, and the formation information output unit. The reception unit receives transport information relevant to the application for use of the aerial transport path formed indoors. The reception unit receives transport information including a requesting party code indicating a requesting party of a package to be transported. The storage unit stores the user code of the user who has registered the use of the aerial transport path. The storage unit stores the user account information in association with the user code of the user who has registered the use of the aerial transport path. The authentication unit authenticates the requesting party of the transport information according to matching between the requesting party code included in the transport information and the user code stored in the storage unit. The determination unit determines whether the aerial transport path can be formed according to the transport information authenticated by the authentication unit. The reception information output unit outputs reception information including a determination result regarding whether the aerial transport path can be formed to a requesting party of the transport information. The transport path formation unit generates formation information of the aerial transport path according to the determination result that the aerial transport path can be formed. The formation information output unit outputs formation information of the aerial transport path to a guide light installed indoors to form the aerial transport path. The authentication unit generates the charging information relevant to the use of the aerial transport path. The charging unit outputs the charging information generated according to the use of the aerial transport path to the billing destination included in the account information of the user.

In the present example embodiment, the charging information generated according to the use of the aerial transport path is output to the billing destination included in the account information of the user. Therefore, according to the present example embodiment, it is possible to appropriately charge the user who uses the aerial transport path formed in response to the reception of the transport information.

Fifth Example Embodiment

Next, a management device 50 according to a fifth example embodiment will be described with reference to the drawings. The management device 50 of the present example embodiment has a configuration in which the management devices of the first to fourth example embodiments are simplified.

Figure 29:
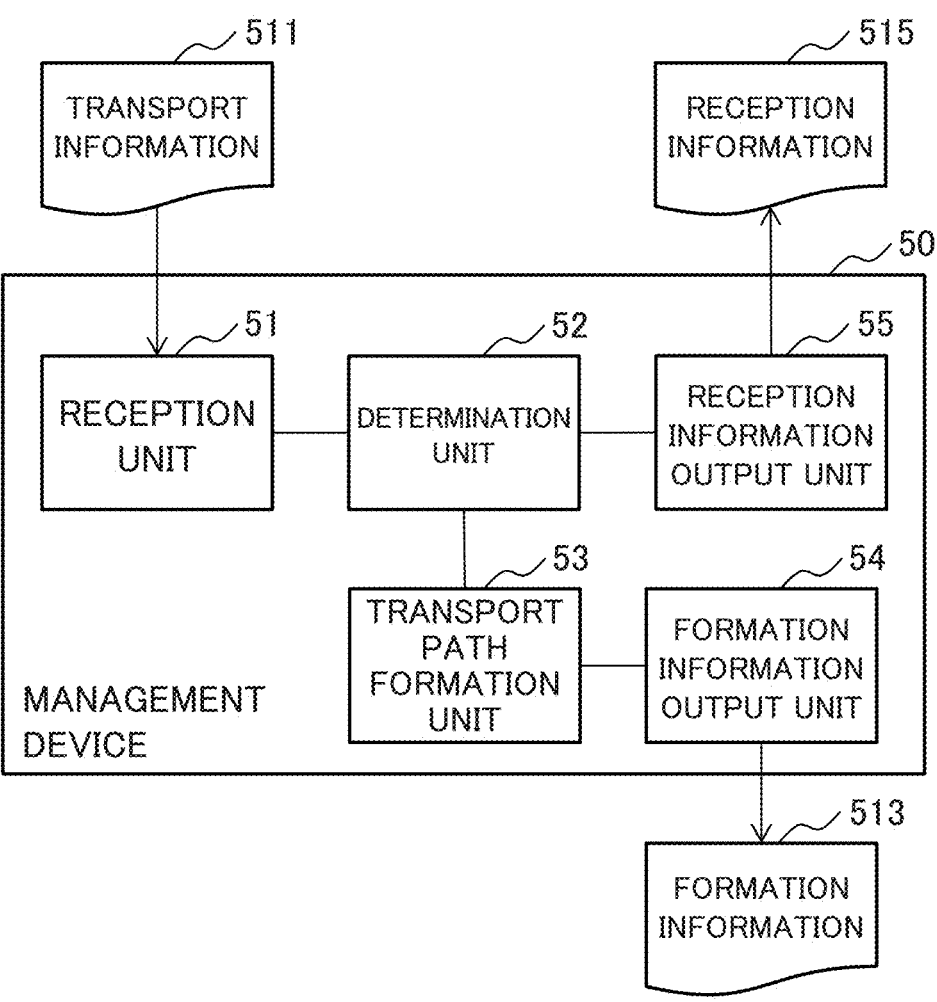
FIG. 29 is a block diagram illustrating an example of a configuration of a management device according to a fifth example embodiment.

FIG. 29 is a block diagram illustrating an example of a configuration of a management device 50 according to the present example embodiment. The management device 50 includes a reception unit 51, a determination unit 52, a transport path formation unit 53, a formation information output unit 54, and a reception information output unit 55.

The reception unit 51 receives transport information 511 relevant to the application for use of the aerial transport path formed indoors. The determination unit 52 determines whether the aerial transport path can be formed according to the transport information 511. The reception information output unit 55 outputs reception information 515 including a determination result regarding whether the aerial transport path can be formed to a requesting party of the transport information 511. The transport path formation unit 53 generates formation information 513 of the aerial transport path according to the determination result that the aerial transport path can be formed. The formation information output unit 54 outputs formation information 513 of the aerial transport path to a guide light installed indoors to form the aerial transport path.

As described above, in the present example embodiment, it is determined whether the aerial transport path can be formed based on the determination result relevant to the transport information. In the present example embodiment, when it is determined that the aerial transport path can be formed, the formation information of the aerial transport path is output to a guide light installed indoors to form the aerial transport path. As a result, according to the present example embodiment, the aerial transport path used by the drone to transport the package can be formed indoors.

(Hardware)

Here, a hardware configuration for executing processing of the control unit according to each example embodiment of the present disclosure will be described using an information processing device 90 of FIG. 30 as an example. The information processing device 90 in FIG. 30 is a configuration example for executing the control and processing of each example embodiment, and does not limit the scope of the present disclosure.

Figure 30:
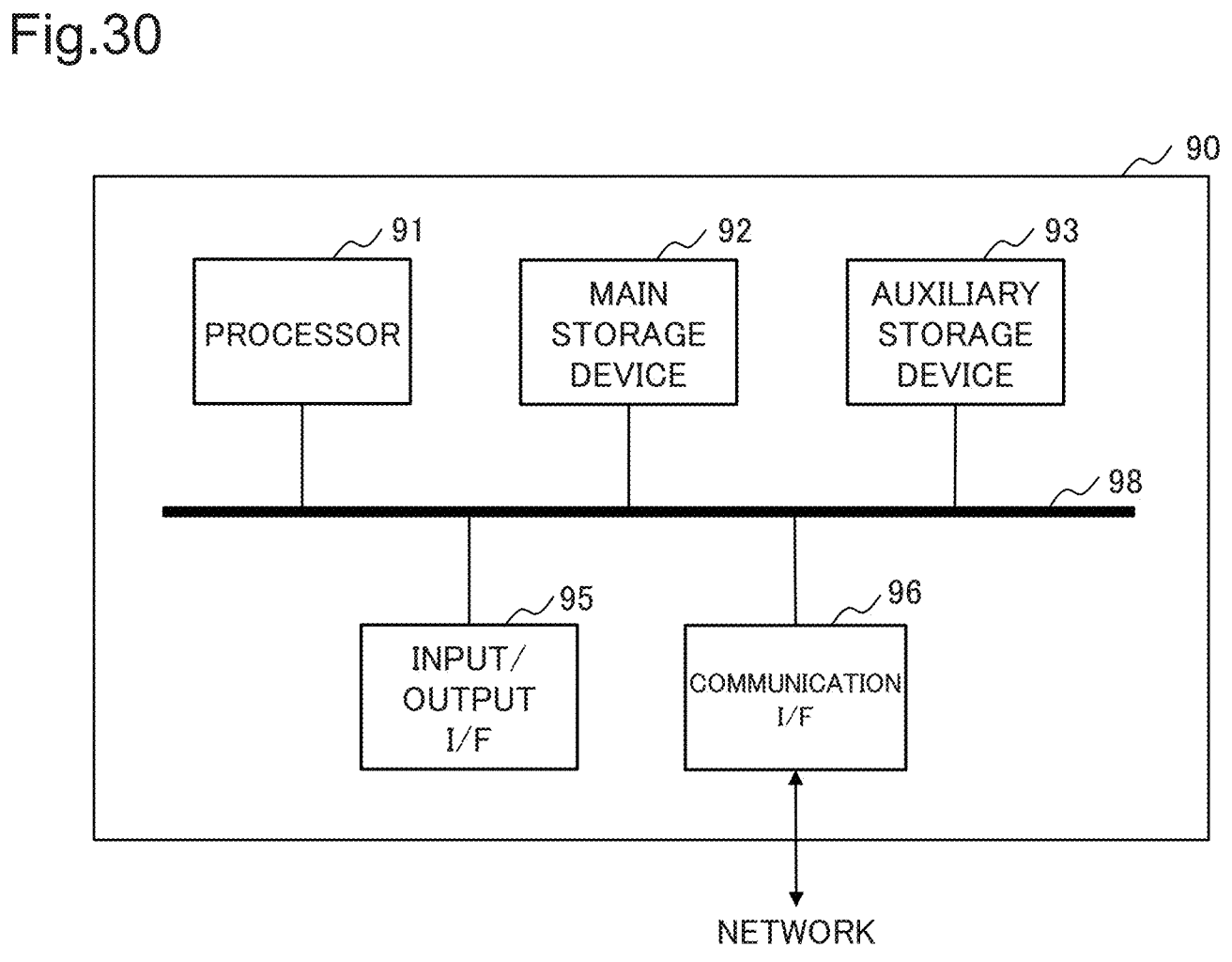

As illustrated in FIG. 30, the information processing device 90 includes a processor 91, a main storage device 92, an auxiliary storage device 93, an input/output interface 95, and a communication interface 96. In FIG. 30, the interface is abbreviated as an I/F. The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via communication interface 96.

The processor 91 develops a program stored in the auxiliary storage device 93 or the like in the main storage device 92. The processor 91 executes the program developed in the main storage device 92. In the present example embodiment, a software program installed in the information processing device 90 may be used. The processor 91 executes processing or control according to each example embodiment.

The main storage device 92 has a region in which a program is developed. A program stored in the auxiliary storage device 93 or the like is developed in the main storage device 92 by the processor 91. The main storage device 92 is implemented by, for example, a volatile memory such as a dynamic random access memory (DRAM). A nonvolatile memory such as a magnetoresistive random access memory (MRAM) may be configured and added as the main storage device 92.

The auxiliary storage device 93 stores various data such as programs. The auxiliary storage device 93 is implemented by a local disk such as a hard disk or a flash memory. Various data may be stored in the main storage device 92, and the auxiliary storage device 93 may be omitted.

The input/output interface 95 is an interface for connecting the information processing device 90 and a peripheral device. The communication interface 96 is an interface for connecting to an external system or device through a network such as the Internet or an intranet based on a standard or a specification. The input/output interface 95 and the communication interface 96 may be shared as an interface connected to an external device.

An input device such as a keyboard, a mouse, or a touch panel may be connected to the information processing device 90 as necessary. These input devices are used to input information and settings. When the touch panel is used as an input device, the display screen of the display device may also serve as the interface of the input device. Data communication between the processor 91 and the input device may be mediated by the input/output interface 95.

The information processing device 90 may be provided with a display device for displaying information. In a case where a display device is provided, the information processing device 90 may include a display control device (not illustrated) for controlling display of the display device. The display device may be connected to the information processing device 90 via input/output interface 95.

The information processing device 90 may be provided with a drive device. The drive device mediates reading of data and a program from a recording medium, writing of a processing result of the information processing device 90 to the recording medium, and the like between the processor 91 and the recording medium (program recording medium). The drive device may be connected to the information processing device 90 via input/output interface 95.

The above is an example of the hardware configuration for enabling the control and processing according to each example embodiment of the present invention. The hardware configuration of FIG. 30 is an example of a hardware configuration for executing the control and processing of each example embodiment, and does not limit the scope of the present invention. A program for causing a computer to execute the control and processing according to each example embodiment is also included in the scope of the present invention. Further, a program recording medium in which the program according to each example embodiment is recorded is also included in the scope of the present invention. The recording medium can be achieved by, for example, an optical recording medium such as a compact disc (CD) or a digital versatile disc (DVD). The recording medium may be implemented by a semiconductor recording medium such as a universal serial bus (USB) memory or a secure digital (SD) card. The recording medium may be implemented by a magnetic recording medium such as a flexible disk, or another recording medium. When a program executed by the processor is recorded in a recording medium, the recording medium is associated to a program recording medium.

The components of each example embodiment may be made in any combination. The components of each example embodiment may be implemented by software or may be implemented by a circuit.

Although the present invention has been described with reference to the example embodiments, the present invention is not limited to the above example embodiments. Various modifications that can be understood by those skilled in the art can be made to the configuration and details of the present invention within the scope of the present invention.

REFERENCE SIGNS LIST 10, 20, 30, 40, 50 management device
11, 21, 31, 41, 51 reception unit
12, 22, 32, 42, 52 determination unit
13, 23, 33, 43, 53 transport path formation unit
14, 24, 34, 44, 54 formation information output unit
15, 25, 35, 45, 55 reception information output unit
26 identification unit
36, 46 storage unit
37, 47 authentication unit

48 charging unit
100, 200, 400, 401 drone
101, 201 main body
102, 202 propeller
103, 203 control unit
104, 204 motor
105, 205 camera
106, 206 communication unit
107, 207 transmission information generation unit
109, 209 power supply
120, 220 arm
131 imaging control unit
132 detection unit
133 calculation unit
134 control condition generation unit
135 control condition setting unit
140, 440 guide light
260 detector

What is claimed is:

1. A management device comprising:
a memory storing instructions; and
a processor connected to the memory and configured to execute the instructions to:
  receive transport information relevant to an application for use of an aerial transport path formed indoors via a network;
  determine whether the aerial transport path can be formed in accordance with the transport information;
  output, to a requesting party of the transport information, reception information including a determination result regarding whether the aerial transport path can be formed via the network;
  generate formation information of the aerial transport path in response to the determination result indicating that the aerial transport path can be formed; and
  output the formation information of the aerial transport path to a plurality of guide lights installed indoors to control illumination of the plurality of guide lights and form the aerial transport path.

2. The management device according to claim 1, wherein the processor is configured to execute the instructions to:
receive the transport information including a transport source and a transport destination of a package to be transported; and
generate the formation information for turning on the guide light installed between the transport source and the transport destination.

3. The management device according to claim 2, wherein the processor is configured to execute the instructions to:
receive the transport information including supplementary information; and
determine whether the aerial transport path can be formed according to the supplementary information.

4. The management device according to claim 3, wherein the processor is configured to execute the instructions to:
receive the transport information including the aerial transport path desired to be used as the supplementary information; and
determine whether the aerial transport path including the aerial transport path desired to be used can be formed according to the aerial transport path desired to be used included in the supplementary information.

5. The management device according to claim 3, wherein the processor is configured to execute the instructions to:
receive the transport information including a type of the package to be transported as the supplementary information; and determine whether the aerial transport path can be formed according to a type of the package.

6. The management device according to claim 2, wherein the processor is configured to execute the instructions to:
acquire a detection value detected by a detector detected by a drone using the aerial transport path to be managed, identify that the package to be transported is mounted on the drone according to the acquired detection value, and outputs a package mounting notification notifying that the package to be transported is mounted on the drone; and
output the formation information of the aerial transport path according to the package mounting notification.

7. The management device according to claim 2, wherein the processor is configured to execute the instructions to:
store a user code of a user who has registered use of the aerial transport path;
authenticate a requesting party of the transport information according to matching between a requesting party code included in the transport information and the user code that has;
receive the transport information including the requesting party code indicating a requesting party of the package to be transported; and
determine whether the aerial transport path can be formed according to the transport information that has authenticated.

8. The management device according to claim 7, wherein the processor is configured to execute the instructions to:
output charging information relevant to use of the aerial transport path;
store account information of the user in association with the user code of the user who has registered use of the aerial transport path;
generate the charging information according to use of the aerial transport path; and
output the charging information generated according to use of the aerial transport path to a billing destination included in the account information of the user.

9. A management method causing a computer to execute:
receiving transport information relevant to an application for use of an aerial transport path formed indoors via a network;
determining whether the aerial transport path can be formed in accordance with the transport information;
outputting, to a requesting party of the transport information, reception information including a determination result regarding whether the aerial transport path can be formed via the network;
generating formation information of the aerial transport path in response to the determination result indicating that the aerial transport path can be formed; and
outputting the formation information of the aerial transport path to a plurality of guide lights installed indoors to control illumination of the plurality of guide lights and form the aerial transport path.

10. The management method according to claim 9, wherein the computer is configured to execute:
receiving the transport information including a transport source and a transport destination of a package to be transported; and
generating the formation information for turning on the guide light installed between the transport source and the transport destination.

11. The management method according to claim 10, wherein the computer is configured to execute:

receiving the transport information including supplementary information; and determining whether the aerial transport path can be formed according to the supplementary information.

12. The management method according to claim 11, wherein the computer is configured to execute receiving the transport information including the aerial transport path desired to be used as the supplementary information; and determining whether the aerial transport path including the aerial transport path desired to be used can be formed according to the aerial transport path desired to be used included in the supplementary information.

13. The management method according to claim 11, wherein the computer is configured to execute;

receiving the transport information including a type of the package to be transported as the supplementary information; and determining whether the aerial transport path can be formed according to a type of the package.

14. The management method according to claim 10, wherein the computer is configured to execute:

acquiring a detection value detected by a detector detected by a drone using the aerial transport path to be managed, identify that the package to be transported is mounted on the drone according to the acquired detection value, and outputs a package mounting notification notifying that the package to be transported is mounted on the drone; and outputting the formation information of the aerial transport path according to the package mounting notification.

15. A non-transitory recording medium having stored therein a program causing a computer to execute:

receiving transport information relevant to an application for use of an aerial transport path formed indoors via a network;

determining whether the aerial transport path can be formed in accordance with the transport information;

outputting, to a requesting party of the transport information, reception information including a determination result regarding whether the aerial transport path can be formed via the network;

generating formation information of the aerial transport path in response to the determination result indicating that the aerial transport path can be formed; and outputting the formation information of the aerial transport path to a plurality of guide light installed indoors to control illumination of the plurality of guide lights and form the aerial transport path.

16. The non-transitory recording medium according to claim 15, wherein the program is configured to cause a computer to execute:

receiving the transport information including a transport source and a transport destination of a package to be transported; and generating the formation information for turning on the guide light installed between the transport source and the transport destination.

17. The non-transitory recording medium according to claim 16, wherein the program is configured to cause a computer to execute:

receiving the transport information including supplementary information; and determining whether the aerial transport path can be formed according to the supplementary information.

18. The non-transitory recording medium according to claim 17, wherein the program is configured to cause a computer to execute:

receiving the transport information including the aerial transport path desired to be used as the supplementary information; and determining whether the aerial transport path including the aerial transport path desired to be used can be formed according to the aerial transport path desired to be used included in the supplementary information.

19. The non-transitory recording medium according to claim 17, wherein the program is configured to cause a computer to execute;

receiving the transport information including a type of the package to be transported as the supplementary information; and determining whether the aerial transport path can be formed according to a type of the package.

20. The non-transitory recording medium according to claim 16, wherein the program is configured to cause a computer to execute:

acquiring a detection value detected by a detector detected by a drone using the aerial transport path to be managed, identify that the package to be transported is mounted on the drone according to the acquired detection value, and outputs a package mounting notification notifying that the package to be transported is mounted on the drone; and outputting the formation information of the aerial transport path according to the package mounting notification.

* * * * *